(12) United States Patent
Klein et al.

(10) Patent No.: US 12,509,624 B1
(45) Date of Patent: Dec. 30, 2025

(54) DOPED-NANOPARTICLE PHOTOCHROMIC HETEROSTRUCTURES

(71) Applicant: HRL Laboratories, LLC, Malibu, CA (US)

(72) Inventors: Shirell Klein, Los Angeles, CA (US); Adam Gross, Santa Monica, CA (US); Gregory Rutkowski, Calabasas, CA (US); Erik Crenshaw, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 18/528,027

(22) Filed: Dec. 4, 2023

Related U.S. Application Data

(63) Continuation-in-part of application No. 18/197,058, filed on May 13, 2023, and a continuation-in-part of
(Continued)

(51) Int. Cl.
   *C09K 9/00* (2006.01)
   *C09K 11/58* (2006.01)
   *G02F 1/17* (2019.01)

(52) U.S. Cl.
   CPC .............. *C09K 9/00* (2013.01); *C09K 11/584* (2013.01); *G02F 1/172* (2013.01); *G02F 2202/10* (2013.01); *G02F 2202/36* (2013.01)

(58) Field of Classification Search
   CPC .................................................. C09K 11/584
   See application file for complete search history.

(56) References Cited

U.S. PATENT DOCUMENTS

| 2018/0216003 A1* | 8/2018 | Zhang .................. C09K 11/642 |
| 2019/0339239 A1 | 11/2019 | Noh et al. |
| 2022/0162085 A1 | 5/2022 | Kobayashi et al. |

FOREIGN PATENT DOCUMENTS

WO    2020175245 A1    9/2020

OTHER PUBLICATIONS

Han et al., "Fast T-Type Photochromism of Colloidal Cu-Doped ZnS Nanocrystals", J. Am. Chem. Soc. 2021, 143, 2239-2249 with Supporting Information.
(Continued)

*Primary Examiner* — William D Young
(74) *Attorney, Agent, or Firm* — O'Connor & Company; Ryan P. O'Connor

(57) ABSTRACT

Some variations provide a photochromic heterostructure comprising: first semiconductor nanoparticles that have an average first-nanoparticle effective diameter from 1 nanometer to 20 nanometers, wherein the first semiconductor nanoparticles are not doped; and second semiconductor nanoparticles that have an average second-nanoparticle effective diameter from 1 nanometer to 60 nanometers, wherein the second semiconductor nanoparticles are doped with one or more transition metals, wherein the second semiconductor nanoparticles have a bandgap energy that is higher than the bandgap energy of the first semiconductor nanoparticles, and wherein the first semiconductor nanoparticles and the second semiconductor nanoparticles are in physical contact with each other. The disclosed photochromic heterostructure is especially useful when lower-energy light excites lower-energy-bandgap first nanoparticles to cause higher-energy-bandgap, doped second nanoparticles to photodarken. If the first nanoparticles were not present, the doped second nanoparticles would require higher-energy light to cause darkening. Examples demonstrate embodiments of the invention.

25 Claims, 7 Drawing Sheets

Related U.S. Application Data application No. 18/197,057, filed on May 13, 2023, and a continuation-in-part of application No. 18/197,060, filed on May 13, 2023, and a continuation-in-part of application No. 18/197,061, filed on May 13, 2023.

(60) Provisional application No. 63/390,634, filed on Jul. 20, 2022.

(56) References Cited

OTHER PUBLICATIONS

Sanada et al., "Origin of the Anomalous Temperature Dependence of the Photochromic Reaction of Cu-Doped ZnS Nanocrystals", J. Phys. Chem. Lett. 2021, 12, 8129-8133.

Ma et al., "Enhancement of Afterglow in ZnS:Cu,Co Water-Soluble Nanoparticles by Aging", J. Phys. Chem. C 2011, 115, 8940-8944.

Ding et al., "Efficiency of Hole Transfer from Photoexcited Quantum Dots to Covalently Linked Molecular Species", J. Am. Chem. Soc.2015, 137, 2021-2029.

Olshansky et al., "Hole Transfer from Photoexcited Quantum Dots: The Relationship between Driving Force and Rate", J. Am. Chem. Soc. 2015, 137, 15567-15575.

Jiang et al., "Aqueous synthesis of color tunable Cu doped Zn—In—S/ZnS nanoparticles in the whole visible region for cellular imaging", J. Mater. Chem. B, 2015,3, 2402-2410.

Joost et al., "Reversible Photodoping of TiO2 Nanoparticles for Photochromic Applications", Chem. Mater. 2018, 30, 8968-8974.

Wang et al., "Reversible Chemochromic MoO3 Nanoribbons through Zerovalent Metal Intercalation", ACS Nano 2015, 9(3), 3226-3233.

Peng et al., "Synthesis and photoluminescence of ZnS:Cu nanoparticles", Optical Materials, vol. 29, Issues 2-3, Nov. 2006, pp. 313-317.

Ito et al., "Photochromism of colloidal ZnO nanocrystal powders under ambient conditions", Photochemical & Photobiological Sciences (2022) 21:1781-1791.

\* cited by examiner

DOPED-NANOPARTICLE PHOTOCHROMIC HETEROSTRUCTURES

PRIORITY DATA

This patent application is a continuation-in-part application of each of U.S. patent application Ser. No. 18/197,057, filed on May 13, 2023; U.S. patent application Ser. No. 18/197,058, filed on May 13, 2023; U.S. patent application Ser. No. 18/197,060, filed on May 13, 2023; and U.S. patent application Ser. No. 18/197,061, filed on May 13, 2023, each of which is hereby incorporated by reference. Each of the four cited parent applications claim priority to U.S. Provisional Patent App. No. 63/390,634, filed on Jul. 20, 2022, which is hereby incorporated by reference herein.

FIELD OF THE INVENTION

The present invention generally relates to photochromic structures, photochromic systems, and methods of making and using photochromic structures and photochromic systems.

BACKGROUND OF THE INVENTION

Photochromism is a reversible photochemical transformation of a chemical species between two forms having different absorption spectra. During the photochemical transformation, there may be various changes in physicochemical properties, such as chemical structure, refractive index, dielectric constant, and oxidation/reduction state. These property changes can be applied to various photonic devices, such as photo-optical switch components.

There are many uses for photochromic materials, in which the materials are colored (or darkened) when irradiated with light of a specific wavelength, the color disappears when the irradiation stops, and the color change is repeated potentially many times. Photochromic materials may be utilized in lenses, windows, and sensors, for example. Photochromic materials can be useful for eyewear, such as sunglasses, to protect eyes while allowing visibility under irradiation from the sun or another light source.

Other possible applications of photochromic systems include, but are not limited to, optical neural networks using photochromic memory media, applications to three-dimensional and near-field optical memory media, chiroptical molecular switches, non-linear optical transformations of photochromic molecules, and liquid crystalline photochromic materials.

Conventionally, the reversal time for photochromic darkening is difficult to control and is generally too long (such as minutes) to be useful for many applications when the materials are used in the solid state. Existing photochromic materials are made from organic molecules that twist, or are made using nanoparticles that undergo a slow reduction. After darkening, both types of materials take a long time to return to the uncolored state, which impedes operator or sensor vision after the light is removed. There is a desire for photochromic materials and systems that enable fast photochromic darkening and reversal thereof.

Another shortcoming with conventional photochromic materials is that they are not active outside of the visible spectrum. The reason for this limitation is that existing photochromics depend on electronic transitions of organic molecules or a limited range of inorganics with UV bandgaps. There is a desire for photochromic materials and systems that enable a greater range of operable wavelengths, such as near infrared (NIR), mid-wave (MWIR), and long-wave infrared (LWIR) electromagnetic wavelengths. Infrared wavelengths are important for many types of sensors, such as sensors for autonomous vehicles, imaging devices, optical power meters, missile guidance, flame monitors, moisture analyzers, night-vision devices, rail safety, water intrusion, and many other commercial applications. No visible-through-LWIR, tunable, and rapidly responsive glare/optical protection system exists today without additional sensors and computation, which adds to complexity and response time.

Improved photochromic materials and systems are needed commercially.

SUMMARY OF THE INVENTION

The present invention addresses the aforementioned needs in the art, as will now be summarized and then further described in detail below.

Some variations provide a photochromic heterostructure comprising:
  (a) first semiconductor nanoparticles that have an average first-nanoparticle effective diameter from about 1 nanometer to about 20 nanometers, wherein the first semiconductor nanoparticles are not doped, and wherein the first semiconductor nanoparticles have a first bandgap energy; and
  (b) second semiconductor nanoparticles that have an average second-nanoparticle effective diameter from about 1 nanometer to about 60 nanometers, wherein the second semiconductor nanoparticles are doped with one or more transition metals, and wherein the second semiconductor nanoparticles have a second bandgap energy, wherein the first bandgap energy is lower than the second bandgap energy, and wherein the first semiconductor nanoparticles and the second semiconductor nanoparticles are in physical contact with each other.

In some embodiments, the photochromic heterostructure comprises a plurality of core-shell structures, wherein each of the core-shell structures contains a core of the first semiconductor nanoparticles, and a shell of the second semiconductor nanoparticles. The core may contain a single first semiconductor nanoparticle, or the core may contain multiple first semiconductor nanoparticles. Preferably, adjacent core-shell structures are in physical contact with each other.

In some embodiments, the photochromic heterostructure comprises a plurality of core-shell structures, wherein each of the core-shell structures contains a core of the second semiconductor nanoparticles, and a shell of the first semiconductor nanoparticles. The core may contain a single second semiconductor nanoparticle, or the core may contain multiple second semiconductor nanoparticles. Preferably, adjacent core-shell structures are in physical contact with each other.

In some embodiments, each of the first semiconductor nanoparticles and the second semiconductor nanoparticles are independently selected from the group consisting of single-element nanoparticles, two-element nanoparticles, three-element nanoparticles, four-element nanoparticles, and combinations thereof.

Single-element nanoparticles may be selected from the group consisting of Si, Ge, and combinations thereof.

Two-element nanoparticles may be selected from the group consisting of ZnS, ZnSe, ZnTe, CdS, CdSe, CdTe, PbS, PbSe, PbTe, InP, InAs, InSb, GaP, GaAs, $Ag_2S$, $Ag_2Se$, $Ag_2Te$, and combinations thereof.

Three-element nanoparticles may be selected from the group consisting of $Zn_xCd_{1-x}S$, $Zn_xCd_{1-x}Se$, $Zn_xCd_{1-x}Te$, $Zn_xPb_{1-x}S$, $Zn_xPb_{1-x}Se$, $Zn_xPb_{1-x}Te$, $Zn_xSn_{1-x}S$, $Zn_xSn_{1-x}Se$, $Zn_xSn_{1-x}Te$, $Pb_xSn_{1-x}S$, $Pb_xSn_{1-x}Se$, $Pb_xSn_{1-x}Te$, $In_xGa_{1-x}P$, $In_xGa_{1-x}As$, $Ag_{2x}Cd_{1-x}S$, $Ag_{2x}Cd_{1-x}Se$, $Ag_{2x}Cd_{1-x}Te$, $Ag_{2x}Pb_{1-x}S$, $Ag_{2x}Pb_{1-x}Se$, $Ag_{2x}Pb_{1-x}Te$, $Ag_{2x}Sn_{1-x}S$, $Ag_{2x}Sn_{1-x}Se$, $Ag_{2x}Sn_{1-x}Te$, and combinations thereof, wherein $0<x<1$.

In some embodiments, the first semiconductor nanoparticles are compositionally different than the second semiconductor nanoparticles. In certain embodiments, the first semiconductor nanoparticles are compositionally the same as the second semiconductor nanoparticles, except for the dopant in the second semiconductor nanoparticles.

In some embodiments, the one or more transition metals are selected from the group consisting of Cu, Fe, Ag, Eu, and combinations thereof.

In some embodiments, the one or more transition metals are incorporated into a crystal lattice of the second semiconductor nanoparticles. In other embodiments, the one or more transition metals are incorporated on surfaces of the second semiconductor nanoparticles. In certain embodiments, the one or more transition metals are incorporated both into a crystal lattice of, and on surfaces of, the second semiconductor nanoparticles. The transition-metal dopant preferably has an orbital that lies within a bandgap of the second semiconductor nanoparticles.

In some embodiments, first ligands are bonded to the first semiconductor nanoparticles. The first ligands may be organic, inorganic, or a combination thereof. In some embodiments, the first ligands contain a carboxylate functional group, a thiol functional group, an amine functional group, or a combination thereof.

In some embodiments, second ligands are bonded to the second semiconductor nanoparticles. The second ligands may be organic, inorganic, or a combination thereof. In some embodiments, the second ligands contain a carboxylate functional group, a thiol functional group, an amine functional group, or a combination thereof.

In some embodiments, the photochromic heterostructure contains a redox agent that is capable of changing an oxidation state of the one or more transition metals.

In some embodiments, the first semiconductor nanoparticles and the second semiconductor nanoparticles are surrounded by a matrix. The matrix may be an organic matrix, an inorganic matrix, or a hybrid organic-inorganic matrix.

Other variations of the invention provide a darkening article comprising:

(A) a photochromic heterostructure comprising:
  first semiconductor nanoparticles that have an average first-nanoparticle effective diameter from about 1 nanometer to about 20 nanometers, wherein the first semiconductor nanoparticles are not doped, and wherein the first semiconductor nanoparticles have a first bandgap energy; and
  second semiconductor nanoparticles that have an average second-nanoparticle effective diameter from about 1 nanometer to about 60 nanometers, wherein the second semiconductor nanoparticles are doped with one or more transition metals, and wherein the second semiconductor nanoparticles have a second bandgap energy, wherein the first bandgap energy is lower than the second bandgap energy,
  and wherein the first semiconductor nanoparticles and the second semiconductor nanoparticles are in physical contact with each other;

(B) ligands bonded to the first semiconductor nanoparticles and/or to the second semiconductor nanoparticles; and (C) a matrix surrounding the first semiconductor nanoparticles and the second semiconductor nanoparticles,
  wherein the first semiconductor nanoparticles are capable of being photoexcited with light below the bandgap energy of the second semiconductor nanoparticles, to create a photoexcited hole,
  wherein the second semiconductor nanoparticles are capable of receiving the photoexcited hole in a dopant energy orbital, to create a new absorption,
  and wherein the photoexcited hole is trappable in the ligands and/or in the matrix, to reverse photochromism of the photochromic heterostructure.

In some embodiments of a darkening article, the photochromic heterostructure comprises a plurality of core-shell structures, wherein each of the core-shell structures contains a core of the first semiconductor nanoparticles, and a shell of the second semiconductor nanoparticles.

In some embodiments of a darkening article, adjacent core-shell structures are in physical contact with each other.

In some embodiments of a darkening article, each of the first semiconductor nanoparticles and the second semiconductor nanoparticles are independently selected from the group consisting of single-element nanoparticles, two-element nanoparticles, three-element nanoparticles, four-element nanoparticles, and combinations thereof.

In certain embodiments of a darkening article, the single-element nanoparticles are selected from the group consisting of Si, Ge, and combinations thereof.

In certain embodiments of a darkening article, the two-element nanoparticles are selected from the group consisting of ZnS, ZnSe, ZnTe, CdS, CdSe, CdTe, PbS, PbSe, PbTe, InP, InAs, InSb, GaP, GaAs, $Ag_2S$, $Ag_2Se$, $Ag_2Te$, and combinations thereof.

In certain embodiments of a darkening article, the three-element nanoparticles are selected from the group consisting of $Zn_xCd_{1-x}S$, $Zn_xCd_{1-x}Se$, $Zn_xCd_{1-x}Te$, $Zn_xPb_{1-x}S$, $Zn_xPb_{1-x}Se$, $Zn_xPb_{1-x}Te$, $Zn_xSn_{1-x}S$, $Zn_xSn_{1-x}Se$, $Zn_xSn_{1-x}Te$, $Pb_xSn_{1-x}S$, $Pb_xSn_{1-x}Se$, $Pb_xSn_{1-x}Te$, $In_xGa_{1-x}P$, $In_xGa_{1-x}As$, $Ag_{2x}Cd_{1-x}S$, $Ag_{2x}Cd_{1-x}Se$, $Ag_{2x}Cd_{1-x}Te$, $Ag_{2x}Pb_{1-x}S$, $Ag_{2x}Pb_{1-x}Se$, $Ag_{2x}Pb_{1-x}Te$, $Ag_{2x}Sn_{1-x}S$, $Ag_{2x}Sn_{1-x}Se$, $Ag_{2x}Sn_{1-x}Te$, and combinations thereof, wherein $0<x<1$.

In some embodiments of a darkening article, the first semiconductor nanoparticles are compositionally different than the second semiconductor nanoparticles. In certain embodiments, the first semiconductor nanoparticles are compositionally the same as the second semiconductor nanoparticles, except for the dopant in the second semiconductor nanoparticles.

In some embodiments of a darkening article, one or more transition metals are selected from the group consisting of Cu, Fe, Ag, Eu, and combinations thereof.

In some embodiments of a darkening article, the one or more transition metals are incorporated into a crystal lattice of the second semiconductor nanoparticles. In other embodiments, the one or more transition metals are incorporated on surfaces of the second semiconductor nanoparticles. In certain embodiments of a darkening article, the transition metals are incorporated both into a crystal lattice of, and on surfaces of, the second semiconductor nanoparticles. The transition-metal dopant preferably has an orbital that lies within a bandgap of the second semiconductor nanoparticles.

In the darkening article, the ligands may be organic, inorganic, or a combination thereof. In some embodiments of a darkening article, the ligands contain a carboxylate functional group, a thiol functional group, an amine functional group, or a combination thereof.

The ligands may be bonded to the first semiconductor nanoparticles, to the second semiconductor nanoparticles, or to both first and second semiconductor nanoparticles. Different types of ligands may be bonded to different types of nanoparticles. For example, first ligands may be bonded to the first semiconductor nanoparticles, while second ligands may be bonded to the second semiconductor nanoparticles.

The matrix may be an organic matrix, an inorganic matrix, or a hybrid organic-inorganic matrix.

In some embodiments of a darkening article, the photochromic heterostructure contains a redox agent that is capable of changing an oxidation state of the one or more transition metals.

Other variations provide a method of controlling photochromism in a photochromic heterostructure, comprising:
  (a) photoexciting first semiconductor nanoparticles with light above the bandgap energy of the first semiconductor nanoparticles and below the bandgap energy of second semiconductor nanoparticles that are present in a photochromic heterostructure with the first semiconductor nanoparticles;
  (b) moving photoexcited holes into the dopant energy orbital of the second semiconductor nanoparticles, to create a new absorption; and
  (c) trapping the photoexcited holes in ligands attached to the first semiconductor nanoparticles, ligands attached to the second semiconductor nanoparticles, in free molecules in a matrix surrounding the first and second semiconductor nanoparticles, or a combination thereof, to reverse the photochromism.

DETAILED DESCRIPTION OF EMBODIMENTS OF THE INVENTION

Figure 1:
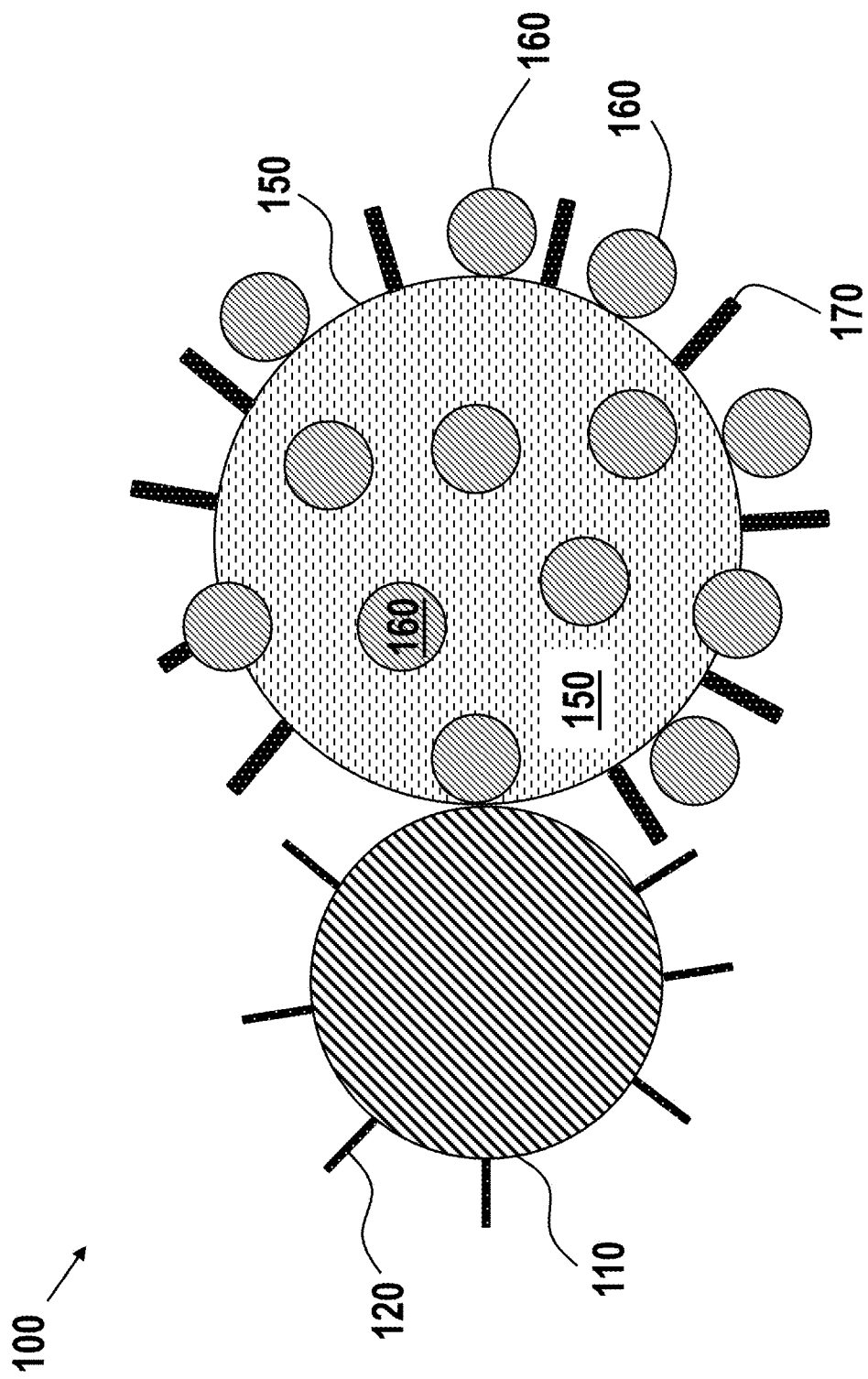
FIG. 1 depicts an exemplary photochromic heterostructure, in some embodiments of the invention.

The principles, structures, compositions, and methods of the present invention will be described in detail by reference to various non-limiting embodiments.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing conditions, concentrations, dimensions, and so forth used in the specification and claims are to be understood as being modified in all instances by the term "about." Accordingly, unless indicated to the contrary, the numerical parameters set forth in the following specification and attached claims are approximations that may vary depending at least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phrase "consisting of" excludes any element, step, or ingredient not specified in the claim. When the phrase "consists of" (or variations thereof) appears in a clause of the body of a claim, rather than immediately following the preamble, it limits only the element set forth in that clause; other elements are not excluded from the claim as a whole. As used herein, the phrase "consisting essentially of" limits the scope of a claim to the specified elements or method steps, plus those that do not materially affect the basis and novel characteristic(s) of the claimed subject matter.

With respect to the terms "comprising," "consisting of," and "consisting essentially of," where one of these three terms is used herein, the presently disclosed and claimed subject matter may include the use of either of the other two terms, except when used in Markush groups. Thus in some embodiments not otherwise explicitly recited, any instance of "comprising" may be replaced by "consisting of" or, alternatively, by "consisting essentially of."

The present invention is premised on the design of a photochromic material in which one nanoparticle is photoexcited and causes a second nanoparticle with redox-labile dopants in physical contact with the first nanoparticle to change optical absorption. In some variations, the present invention provides photochromic heterostructures made from a lower-energy-bandgap first nanoparticle and a higher-energy-bandgap, doped second nanoparticle that is in contact with the first nanoparticle. First semiconductor nanoparticles are photoexcited with light above their bandgap energy but below the bandgap energy of second semiconductor nanoparticles that are physically touching the first semiconductor nanoparticles.

The present invention utilizes nanoparticles that photochromically darken in response to incident light by photooxidizing a dopant to reversibly create an optically absorbing mid-gap electronic state. The wavelengths that trigger the photochromic darkening as well as the absorbed wavelengths from the mid-gap electronic state may be tuned by changing the composition and size of first and second nanoparticles, as well as the dopant in the second nanoparticles.

The present invention overcomes constraints in existing photochromics, for which the material that absorbs light is the same material that darkens in response to that light. Using the disclosed photochromic heterostructures, the material that controls the triggering wavelength—and thus the wavelength that causes darkening—is separated from the bandgap of the material that darkens in response to the triggering wavelength. This configuration, which is heretofore unknown, is especially useful when lower-energy light excites the lower-energy-bandgap first nanoparticle and causes a higher-energy-bandgap, doped second nanoparticle to photodarken. Notably, if the first nanoparticle was not present, the doped second nanoparticle would have required higher-energy light to cause darkening.

In some variations, the photochromic composition darkens when a photoexcited electron hops to an adjacent nanoparticle, followed by the exchange of a dopant electron with a photoexcited hole in the valence band. This movement of carriers may be $10^3$-$10^4$ times faster than existing photochromics. The disclosed photochromic materials darken by moving electrons and holes instead of moving mass, which results in fast darkening. In turn, fast darkening enables the photochromic material to respond before glare or incident light causes the driver or sensor to lose control of a vehicle. The reversal of photochromism can be mediated, as disclosed herein, allowing control of the reversal time so that the material lightens once blinding stops. Consequently, driver/sensor vision is optimized. The time scale for the reversal of darkening may be tuned using hole-accepting molecules that are adjacent to the nanoparticles. The reversal of darkening is not controlled by the amount of water, as in many conventional photochromic materials.

Existing doped nanoparticle-based photochromics only darken in response to exciting an electron across the bandgap of the nanoparticle. Conventionally, one material's band structure controls both the darkening trigger wavelength and the absorbing states created by an oxidized dopant. By contrast, according to the disclosed invention, the trigger wavelength and the absorbed states can be tuned independently by separating the functions into two different semiconductor materials.

Conventional photochromics are not active outside of the visible spectrum because they depend on electronic transitions of organic molecules or inorganic materials having UV bandgaps. By contrast, the disclosed photochromic compositions, systems, and methods can become active in the visible spectrum, the NIR spectrum, the MWIR spectrum, and the LWIR spectrum. The reason for the expanded functionality into the IR range is that the photochromic compositions, systems, and methods utilize mid-gap electronic states and can include a greater range of materials than known photochromics.

Compared to conventional photochromics, the wavelengths that cause photochromism are more tunable in variations of this invention. The wavelengths that cause photochromism can be tuned using the composition of the first and second nanoparticles, as well as the size of the first and second nanoparticles, for example.

Additionally, compared to conventional photochromics, the wavelengths that cause absorption of light once the photochromism is triggered are more tunable in variations of this invention. The light absorption may be caused by a mid-gap dopant state in the second nanoparticles. The dopant moves the energy level of the state inside the gap. Consequently, the wavelengths that absorb light are adjusted by the dopant.

Photochromics sold today cannot be turned on and off. Because the disclosed invention functions by moving electrons across a nanoparticle and placing a photoexcited hole in a dopant orbital, the carriers may be swept out of the material to stop the photochromic state. This feature can be accomplished using an electric field. By placing electrodes on a sheet containing the semiconductor nanoparticles, for example, an on/off function is enabled. Additionally, the external electric field allows the use of traditionally emissive nanomaterials as photochromics, because the field will quench emissive recombination.

Some variations provide a photochromic heterostructure comprising:
 (a) first semiconductor nanoparticles that have an average first-nanoparticle effective diameter from about 1 nanometer to about 20 nanometers, wherein the first semiconductor nanoparticles are not doped, and wherein the first semiconductor nanoparticles have a first bandgap energy; and
 (b) second semiconductor nanoparticles that have an average second-nanoparticle effective diameter from about 1 nanometer to about 60 nanometers, wherein the second semiconductor nanoparticles are doped with one or more transition metals, and wherein the second semiconductor nanoparticles have a second bandgap energy,
 wherein the first bandgap energy is lower than the second bandgap energy,
 and wherein the first semiconductor nanoparticles and the second semiconductor nanoparticles are in physical contact with each other.

In some embodiments, the photochromic heterostructure comprises a plurality of first semiconductor nanoparticles and a plurality of second semiconductor nanoparticles, wherein the first and second semiconductor nanoparticles are physically distinct but are touching each other. See, for example, FIG. 1 and FIG. 2.

Compared to core-shell structures discussed below, the total area across which the first and second semiconductor nanoparticles are touching each other can be relatively low. For that reason, high overlap of band structures for the first and second nanoparticles may be necessary. The overlap facilitates electron transport (e.g., by electron tunneling) between the semiconductor nanoparticles.

In some embodiments, the photochromic heterostructure comprises a plurality of core-shell structures, wherein each of the core-shell structures contains a core of the first semiconductor nanoparticles, and a shell of the second semiconductor nanoparticles. See, for example, FIG. 3 and FIG. 4.

In this disclosure, a shell of a semiconductor, such as in the form of a spherical shell/annulus, is considered a semiconductor nanoparticle. The core may contain a single first semiconductor nanoparticle, or the core may contain multiple first semiconductor nanoparticles. Preferably, adjacent core-shell structures are in physical contact with each other.

In some embodiments, the photochromic heterostructure comprises a plurality of core-shell structures, wherein each of the core-shell structures contains a core of the second semiconductor nanoparticles, and a shell of the first semiconductor nanoparticles. The core may contain a single second semiconductor nanoparticle, or the core may contain multiple second semiconductor nanoparticles. Preferably, adjacent core-shell structures are in physical contact with each other.

Other geometries for the photochromic heterostructure may be employed, such as a scaffold-like system or an interpenetrating three-dimensional network. Complex geometries may be achieved using additive manufacturing, for example.

In some embodiments, each of the first semiconductor nanoparticles and the second semiconductor nanoparticles are independently selected from the group consisting of single-element nanoparticles, two-element nanoparticles, three-element nanoparticles, four-element nanoparticles, and combinations thereof. Note that in this paragraph and related description in the specification, any dopants in the second semiconductor nanoparticles are not counted in number of elements in the semiconductor material itself. For example, Cu-doped ZnS would be counted as a two-element (Zn and S) semiconductor material that is doped with Cu.

Single-element nanoparticles may be selected from the group consisting of Si, Ge, and combinations thereof, for example.

Two-element nanoparticles may be selected from the group consisting of ZnS, ZnSe, ZnTe, CdS, CdSe, CdTe, PbS, PbSe, PbTe, InP, InAs, InSb, GaP, GaAs, $Ag_2S$, $Ag_2Se$, $Ag_2Te$, and combinations thereof, for example.

Three-element nanoparticles may be selected from the group consisting of $Zn_xCd_{1-x}S$, $Zn_xCd_{1-x}Se$, $Zn_xCd_{1-x}Te$, $Zn_xPb_{1-x}S$, $Zn_xPb_{1-x}Se$, $Zn_xPb_{1-x}Te$, $Zn_xSn_{1-x}S$, $Zn_xSn_{1-x}Se$, $Zn_xSn_{1-x}Te$, $Pb_xSn_{1-x}S$, $Pb_xSn_{1-x}Se$, $Pb_xSn_{1-x}Te$, $In_xGa_{1-x}P$, $In_xGa_{1-x}As$, $Ag_{2x}Cd_{1-x}S$, $Ag_{2x}Cd_{1-x}Se$, $Ag_{2x}Cd_{1-x}Te$, $Ag_{2x}Pb_{1-x}S$, $Ag_{2x}Pb_{1-x}Se$, $Ag_{2x}Pb_{1-x}Te$, $Ag_{2x}Sn_{1-x}S$, $Ag_{2x}Sn_{1-x}Se$, $Ag_{2x}Sn_{1-x}Te$, and combinations thereof, wherein $0<x<1$, for example.

Four-element nanoparticles may be selected from the group consisting of copper indium gallium selenide, copper zinc tin sulfide, and combinations thereof, for example.

When the semiconductor nanoparticles contain a combination of specific nanoparticles having different numbers of elements, the combination may be a mixture, with no chemical bonding between the semiconductor nanoparticles. In other embodiments, the semiconductor nanoparticles contain specific nanoparticles having different numbers of elements, in which there is chemical bonding (e.g., ionic bonding, covalent bonding, or metallic bonding) or at least weak forces that may attract the nanoparticles to each other.

In some embodiments, the first semiconductor nanoparticles are compositionally different than the second semiconductor nanoparticles, apart from the presence of the dopant in the second semiconductor nanoparticles. In certain embodiments, the first semiconductor nanoparticles are compositionally the same as the second semiconductor nanoparticles, except for the dopant in the second semiconductor nanoparticles. For example, the first semiconductor nanoparticles and the second semiconductor nanoparticles may both be $Zn_xCd_{1-x}S$ ($0<x<1$), with the second semiconductor nanoparticles also being doped with Cu, Fe, Ag, and/or Eu, for example.

The first semiconductor nanoparticles may be selected to have a bandgap (i.e., bandgap energy) from about 0.1 eV to about 5 eV, for example, measured at 25° C. and 1 bar. In various embodiments, the first semiconductor nanoparticles are selected to have a bandgap of about, at least about, or at most about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5 eV, including any intervening range, measured at 25° C. and 1 bar.

The second semiconductor nanoparticles may be selected to have a bandgap (i.e., bandgap energy) from about 0.1 eV to about 5 eV, for example, measured at 25° C. and 1 bar. In various embodiments, the second semiconductor nanoparticles are selected to have a bandgap of about, at least about, or at most about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5 eV, including any intervening range, measured at 25° C. and 1 bar. Note that these bandgap energies are for the second semiconductor nanoparticles themselves, in the absence of transition-metal doping.

The doped second semiconductor nanoparticles may be selected to have a bandgap (i.e., bandgap energy) from about 0.2 eV to about 5 eV, for example, measured at 25° C. and 1 bar. In various embodiments, the doped second semiconductor nanoparticles are selected to have a bandgap of about, at least about, or at most about 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, or 5 eV, including any intervening range, measured at 25° C. and 1 bar. As stated earlier, the bandgap of the first semiconductor nanoparticles is lower energy than the bandgap of the doped second semiconductor nanoparticles.

In some embodiments, the average first-nanoparticle effective diameter is from about 1 nanometer to about 5 nanometers. In various embodiments, the average first-nanoparticle effective diameter is about, at least about, or at most about 1 nm, 1.5 nm, 2 nm, 2.5 nm, 3 nm, 3.5 nm, 4 nm, 4.5 nm, 5 nm, 5.5 nm, 6 nm, 6.5 nm, 7 nm, 7.5 nm, 8 nm, 9 nm, 10 nm, 11 nm, 12 nm, 13 nm, 14 nm, 15 nm, 16 nm, 17 nm, 18 nm, 19 nm, or 20 nm, including any intervening range. The effective diameter of a first nanoparticle is its diameter in the case of a sphere, a cylinder, a needle, or a rod. For other geometries, the effective diameter is $(6V/\pi)^{1/3}$, where V is the volume of a first nanoparticle.

In some embodiments, the average second-nanoparticle effective diameter is from about 1 nanometer to about 30 nanometers. In various embodiments, the average second-nanoparticle effective diameter is about, at least about, or at most about 1 nm, 2 nm, 3 nm, 4 nm, 5 nm, 6 nm, 7 nm, 8 nm, 9 nm, 10 nm, 11 nm, 12 nm, 13 nm, 14 nm, 15 nm, 16 nm, 17 nm, 18 nm, 19 nm, 20 nm, 21 nm, 22 nm, 23 nm, 24 nm, 25 nm, 26, nm, 27 nm, 28 nm, 29 nm, 30 nm, 35 nm, 40 nm, 45 nm, 50 nm, 55 nm, or 60 nm, including any intervening range. The effective diameter of a second nanoparticle is its diameter in the case of a sphere, a cylinder, a needle, or a rod. For other geometries, the effective diameter is $(6V/\pi)^{1/3}$, where V is the volume of a second nanoparticle.

When the second semiconductor nanoparticles are distinct particles from the first semiconductor nanoparticles (i.e., not core-shell assemblies), the second semiconductor nanoparticles preferably have a second-nanoparticle effective diameter from about 1 nanometer to about 20 nanometers.

In some embodiments, the average first-nanoparticle effective diameter is less than the average second-nanoparticle effective diameter (e.g., FIG. 1). In some embodiments, the average first-nanoparticle effective diameter is greater than the average second-nanoparticle effective diameter. In some embodiments, the average first-nanoparticle effective diameter is about the same as the average second-nanoparticle effective diameter.

Particle sizes may be measured by a variety of techniques, including dynamic light scattering, laser diffraction, X-ray diffraction peak width analysis (using the Scherrer equation), or image analysis, for example. Dynamic light scattering is a non-invasive, well-established technique for measuring the size and size distribution of particles typically in the submicron region, and with the latest technology down to 1 nanometer. Laser diffraction is a widely used particle-size measurement technique for materials ranging from hundreds of nanometers up to several millimeters in size. Exemplary dynamic light scattering instruments and laser diffraction instruments for measuring particle sizes are available from Malvern Instruments Ltd., Worcestershire, UK. Image analysis to estimate particle sizes and distributions can be done directly on photomicrographs, scanning electron micrographs, or other images.

The shape of the first and second semiconductor nanoparticles may vary. In some embodiments, the nanoparticles are spherical or approximately spherical. In various embodiments, the nanoparticles are spheres, rods, needles, platelets, cubes, pyramids, ovoids, randomly shaped objects, or a combination thereof. The shape of the first and second semiconductor nanoparticles may be the same or different. For example, in FIGS. 1 and 2, both the first and second semiconductor nanoparticles are depicted as spherical, whereas in FIGS. 3 and 4, the first semiconductor nanoparticles are depicted as spherical while the second semiconductor nanoparticles are depicted as spherical shells (3D annulus).

The photochromic heterostructure contains distinct particles or assemblies, not grains of a single piece of bulk polycrystalline semiconductor material. The analytical techniques recited above to measure nanoparticle size (e.g., dynamic light scattering) may be used to show that the photochromic heterostructure contains distinct particles or assemblies rather than grains of a bulk material.

Another way to demonstrate the presence of distinct particles is with a bandgap analysis. In a bulk polycrystalline semiconductor, the bandgap is fixed due to a continuous energy state. In individual semiconductor nanoparticles, the bandgap is size-dependent and can be altered to produce a range of energies between the valence band and conduction band. This is the quantum confinement effect. Semiconductor nanoparticles that are small enough to be governed by the quantum confinement effect are known as "quantum dots". Generally speaking, quantum confinement can be observed once the diameter of a semiconductor nanoparticle is of the same magnitude as the de Broglie wavelength of the electron wave function. When semiconductor nanoparticles are this small, their electronic and optical properties deviate substantially from the electronic and optical properties of bulk materials made from the same composition. The result is that the bandgap becomes dependent on particle size. As the size of the semiconductor decreases, the electrons and electron holes come closer in space, and the energy required to activate them increases. The bandgap of each individual semiconductor nanoparticle (quantum dot) is thus higher than the bandgap of the bulk semiconductor material of the same composition as the quantum dots.

The concentration of first semiconductor nanoparticles within the photochromic heterostructure vary, such as from about 5 wt % to about 90 wt %, depending on the concentrations of second semiconductor nanoparticles, ligands, matrix, and redox agent, all described later. In various embodiments, the concentration of first semiconductor nanoparticles within the photochromic heterostructure is about, at least about, or at most about 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, or 90 wt %, including any intervening range (e.g., 10-50 wt %).

The concentration of second semiconductor nanoparticles (including dopants) within the photochromic heterostructure vary, such as from about 5 wt % to about 90 wt %, depending on the concentrations of first semiconductor nanoparticles, ligands, matrix, and redox agent, all described later. In various embodiments, the concentration of second semiconductor nanoparticles within the photochromic heterostructure is about, at least about, or at most about 5 wt %, 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, or 90 wt %, including any intervening range (e.g., 10-50 wt %).

The combined concentration of first semiconductor nanoparticles and second semiconductor nanoparticles (including dopant) within the photochromic heterostructure vary, such as from about 10 wt % to about 100 wt %, depending on the concentrations (if any) of ligands, matrix, and redox agent, all described later. In various embodiments, the combined concentration is about, at least about, or at most about 10 wt %, 15 wt %, 20 wt %, 25 wt %, 30 wt %, 35 wt %, 40 wt %, 45 wt %, 50 wt %, 55 wt %, 60 wt %, 65 wt %, 70 wt %, 75 wt %, 80 wt %, 85 wt %, 90 wt %, 95%, 99 wt %, 99.5 wt %, or 99.9 wt %, including any intervening range. In certain embodiments, the combined concentration of first and second semiconductor nanoparticles within the photochromic heterostructure is at least 90 wt %.

The second semiconductor nanoparticles are doped with one or more transition metals. In some embodiments, the transition metals are selected from the group consisting of copper (Cu), iron (Fe), silver (Ag), europium (Eu), and combinations thereof. Combinations of transition metals refers to the possibility to employ two or more transition metals, such as both copper (Cu) and silver (Ag), within the second nanoparticle. Typically, when two or more transition metals are used, there is not any intermetallic bonding between the metal elements. The elements may interdiffuse into each other or remain as separate metal (dopant) phases. Dopant elements preferably remain atomic (rather than forming compounds) in order to function as dopants. Thus for example a combination of Cu and Ag means there are separate Cu(II) and Ag(I) dopant particles, not intermetallic Cu—Ag compounds. While the dopant particles are preferably pure metals, it will be recognized that impurities (including metal compounds) may be present in the transition-metal dopant particles, such that absolute purity (100 wt %) is not strictly necessary.

Other transition metals may be employed as dopants, such as nickel (Ni), manganese (Mn), cobalt (Co), and/or vanadium (V), for example, either with or without one or more of Cu, Fe, Ag, or Eu. Other transition metals may be used as dopants, such as Zn, Cr, V, Ti, Sc, Cd, Pd, Rh, Ru, Tc, Mo, Nb, Zr, Y, Hg, Au, Pt, Ir, Os, Re, W, Ta, Hf, La, Lu, Yb, Tm, Er, Ho, Dy, Tb, Gd, Sm, Pm, Nd, Pr, Ce, and combinations thereof. The transition-metal dopant preferably is pure metal (neutral or ionic) and not metal compounds such as halides, oxides, nitrides, sulfides, etc. For example, when the transition-metal dopant is copper, it is preferred that the dopant contains pure Cu(II) and not $CuCl_2$ or other copper halides.

Typically, the dopants do not form chemical bonds or metallic bonds with the elements of the second semiconductor. Rather, the dopants may be intercalated into the semiconductor material, dissolved within the semiconductor material, phase-separated within the semiconductor material, and/or physically coated on a surface of the semiconductor material. In some embodiments, transition-metal dopant elements are incorporated (e.g., absorbed or intercalated) into a crystal lattice of the second semiconductor nanoparticles. In other embodiments, the transition-metal dopant is incorporated on surfaces of the second semiconductor nanoparticles. In certain embodiments, the transition-metal dopant is both incorporated into a crystal lattice of, as well as incorporated on surfaces of, the second semiconductor nanoparticles. When the dopant is disposed on surfaces of the second semiconductor nanoparticles, there may be a continuous or discontinuous coating of the transition-metal dopant.

The transition-metal dopant preferably has an orbital that lies within a bandgap of the second semiconductor nanoparticles. This allows the dopant to reversibly provide an electron (creating a hole) with a second semiconductor nanoparticle. The hole is the absence of an electron in a bonding orbital of the transition-metal dopant.

The transition-metal dopant is physically distinct from the second semiconductor nanoparticles, as depicted in FIG. 1 showing dopant particles 160 and a single semiconductor nanoparticle 150. In some embodiments in which a common metal, such as silver, is contained both in second semiconductor nanoparticles (e.g., $Ag_2S$) and in dopant particles (e.g., Ag), the dopant particles are physically different than the Ag content of the $Ag_2S$ nanoparticles. In this case, the Ag dopant atoms are not part of the orthorhombic crystals of the $Ag_2S$ nanoparticles. In other embodiments, transition-metal dopant atoms can replace metal atoms in a lattice. For example, in the case of ZnS second semiconductor nanoparticles and Cu dopant particles, the Cu dopant atoms may replace some Zn atoms in the ZnS lattice, in which case the Cu atoms are bonded within the lattice structure. When the Cu dopant particles are at the surface of the second semiconductor nanoparticles, the Cu dopant particles can take the form of Cu ions (e.g., $Cu^{2+}$) that are ionically bonded to a terminal sulfur ion of ZnS, or the Cu ions can replace Zn atoms at the edge of the nanoparticle crystal, for example.

In some embodiments, the oxidation potential of the transition-metal dopant is less than the oxidation potential of the second semiconductor nanoparticle anion. Also, in some embodiments, the reduction potential of the transition-metal dopant is less than the reduction potential of the second semiconductor nanoparticle anion. Using these constraints, changing the dopant redox state does not change the oxidation state of the second semiconductor nanoparticle itself.

The transition metal takes the form of transition-metal dopant particles. The size of each transition-metal dopant particle is typically less than the average second-nanoparticle effective diameter. A transition-metal dopant particle may be as small as a volume defined by a single dopant atom, or as large as about one-half of the average second-nanoparticle effective diameter, for example, when a dopant particle contains a dopant phase with a plurality of dopant atoms. In various embodiments, the average effective diameter of the dopant particles is about, at least about, or at most about 0.1 nm, 0.2 nm, 0.3 nm, 0.4 nm, 0.5 nm, 0.6 nm, 0.7 nm, 0.8 nm, 0.9 nm, 1 nm, 2 nm, 3 nm, 4 nm, 5 nm, 6 nm, 7 nm, 8 nm, 9 nm, or 10 nm, including any intervening range.

The number of transition-metal dopant particles per second semiconductor nanoparticle may vary widely, such as from 1 to $10^6$, preferably at least about 10, such as about, at least about, or at most about 10, $10^2$, $10^3$, $10^4$, $10^5$, or $10^6$, including any intervening range.

The extent of doping may also be characterized by the mass ratio of transition-metal dopant particles to the second semiconductor nanoparticles (the "dopant ratio"). The dopant ratio may be selected from about 0.0001 to about 0.1, for example. In various embodiments, the dopant ratio is selected as about, at least about, or at most about 0.0001, 0.0005, 0.001, 0.002, 0.003, 0.004, 0.005, 0.006, 0.007, 0.008, 0.009, 0.01, 0.02, 0.03, 0.04, 0.05, 0.06, 0.07, 0.08, 0.09, or 0.1, including any intervening range.

The concentration of transition-metal dopant particles within the photochromic heterostructure may vary, such as from about 0.001 wt % to about 10 wt %, preferably from about 0.01 wt % to about 1 wt %. In various embodiments, the concentration of transition-metal dopant particles within the photochromic heterostructure is about, at least about, or at most about 0.001 wt %, 0.005 wt %, 0.01 wt %, 0.05 wt %, 0.1 wt %, 0.2 wt %, 0.3 wt %, 0.4 wt %, 0.5 wt %, 0.6 wt %, 0.7 wt %, 0.8 wt %, 0.9 wt %, or 1.0 wt %, including any intervening range. In some embodiments, the concentration of transition-metal dopant particles within the photochromic heterostructure is less than about 5 wt %, 4 wt %, 3 wt %, 2 wt %, or 1 wt %.

In some embodiments, first ligands are bonded to the first semiconductor nanoparticles. The first ligands may be organic, inorganic, or a combination thereof. In some embodiments, the first ligands contain a carboxylate functional group, a thiol functional group, an amine functional group, or a combination thereof.

In some embodiments, second ligands are bonded to the second semiconductor nanoparticles. The second ligands may be organic, inorganic, or a combination thereof. In some embodiments, the second ligands contain a carboxylate functional group, a thiol functional group, an amine functional group, or a combination thereof. The second ligands may be chemically the same as, or different than, the first ligands. In embodiments in which the first semiconductor nanoparticles do not contain any ligands, but the second semiconductor nanoparticles contain ligands, the ligands on the second semiconductor nanoparticles are still referred to as "second" ligands in reference to being attached to the second semiconductor nanoparticles.

In some embodiments, the first ligands and/or the second ligands are organic ligands. In certain embodiments, the organic ligands contain 12 or fewer carbon atoms. In various embodiments, the organic ligands contain 16, 15, 14, 13, 12, 11, 10, 9, 8, 7, 6, 5, 4, 3, 2, or 1 carbon atoms. When there are multiple types of organic ligands, an average carbon number is calculated, weighted by the relative weight fraction of each organic ligand relative to all organic ligands present. The average number of carbon atoms may be 16 or less, such as 12 or less.

In some embodiments, the organic ligands contain carboxylate functional groups. Carboxylates can be beneficial compared to some other types of organic ligands, such as thiols. Thiols are noxious and require more waste handling than carboxylates. The synthesis of carboxylates is therefore expected to be more scalable than that of thiols.

Organic ligands with carboxylates may be selected from the group consisting of 4-pentenoate, phenylacetate, 3-phenylpropionate, 4-phenylbutyrate, methacrylate, and combinations thereof, for example. There are many possible organic ligands that contain one or more carboxylate functional groups and that contain 16 or fewer carbon atoms. Organic ligands with carboxylate functional groups are typically derived from the corresponding acid. 4-Pentenoate, $CH_2=CHCH_2CH_2COO^-$, may be derived from 4-pentenoic acid, $CH_2=CHCH_2CH_2COOH$, for example. Organic ligands with carboxylate functional groups may also be derived from a corresponding carboxylate salt, such as sodium 4-pentenoate, $CH_2=CHCH_2CH_2COONa$.

The organic ligands may be bonded to the nanoparticles at the carboxylate functional groups. For example, in the case of methacrylic acid as organic ligand and ZnS as nanoparticle, the organic ligand may formally be methacrylate, $CH_3CH_2COO$, in which a hydrogen atom has been removed, and the bond is $CH_3CH_2COO$—ZnS. Alternatively, $(CH_3CH_2COO)_2Zn$ may be formed, in which $Zn^{2+}$ forms by local removal of sulfur from ZnS, and there is no bonding directly with sulfur. Alternatively, or additionally, there may be $Zn^+$ at the surface of the nanoparticle, such that the Zn atom is only bonded to one S atom, not two S atoms as is found in the crystal. This will make an ionic bond with the carboxylate. Partial bonding may also occur, in which methacrylic acid remain in acid form, $CH_3CH_2COOH$, and forms a weak ionic bond with the surface of ZnS.

A "hole" refers to an electron hole which is a quasiparticle associated with the lack of an electron at a position where one could exist in an atom or atomic lattice. A "photoexcited hole" refers to a hole created by photoexcitation, which is excitation caused by one or more photons. In a normal atom or crystal lattice, the negative charge of electrons is balanced by the positive charge of atomic nuclei; the absence of an electron leaves a net positive charge at the hole's location.

In some embodiments employing organic ligands on the second semiconductor nanoparticles, the organic ligands accept photoexcited holes from the dopant particles. The hole-accepting organic ligands may contain $C=C$ aromatic bonds (bond order of 1.5), $C=C$ double bonds (bond order of 2), $C\equiv C$ triple bonds (bond order of 3), or a combination thereof, which may collectively be referred to as unsaturated carbon-carbon bonds (unsaturated bonds are not single C—C bonds). The hole-accepting organic ligands may contain aromatic rings, such as phenyl groups.

When hole-trapping unsaturated organic ligands are employed, the spacing between the nearest unsaturated carbon-carbon bonds and the nanoparticle surface controls the rate of hole acceptance. This spacing may be controlled according to the chain length between the bonding site of the functional group on the nanoparticle surface and the unsaturated carbon-carbon bonds. When unsaturated bonds are farther from the surface, the rate of hole transfer to the ligand is slower, and the photochromic decolorization time becomes longer compared to the rate of hole transfer when there is a shorter distance between the unsaturated bonds and the nanoparticle surface. In some embodiments, there are 8 or less carbon atoms between a bond site and the first unsaturated carbon atom—that is, a carbon atom with an aromatic bond, a double bond, or a triple bond—in the direction away from the bond site, on average. An average is used because there can be multiples types of organic ligands with varying chain lengths. The bond site is defined as the site at which an organic ligand bonds to a semiconductor nanoparticle. The average number of carbon atoms between a bond site and the first unsaturated carbon atom may be referred to as the "ligand hole-trap distance"—a parameter that chemically characterizes one or more organic ligands employed. The units of ligand hole-trap distance are number of carbon atoms, which formally is a dimensionless quantity. The actual molecular distance in angstroms may be calculated or simulated, it being understood that the true distance will depend on the exact molecular structure (including side chains). The actual distance in space will also depend on the dynamics of an organic ligand as it potentially moves around, e.g., twists or folds on itself to shorten the actual distance from the bond site to the first unsaturated bond.

In counting the number of carbon atoms for the ligand hole-trap distance, carbon atoms along the main chain are counted, including carbon contained in a main-chain carboxylate functional group, but ignoring carbon atoms in side chains. In this regard, the main chain is defined as the carbon chain that has the lowest number of carbon atoms until an unsaturated bond arises. Thus if an organic ligand has a long primary chain of 10 carbon atoms and a side group off the third carbon, where the side group starts with a double-bonded carbon atom, then the number of carbon atoms between the bond site and the first unsaturated carbon atom is 4; that chain becomes the main chain for purposes of calculating the ligand hole-trap distance.

The ligand hole-trap distance may be 7 carbon atoms, 6 carbon atoms, 5 carbon atoms, 4 carbon atoms, 3 carbon atoms, 2 carbon atoms, or 1 carbon atom. An example of an organic ligand with 8 or less carbon atoms between a bond site and the first carbon atom with an aromatic bond, a double bond, or a triple bond is 4-pentenoate, which has 4 carbon atoms between the bond site and the carbon atom that has a double bond ($C=C$). An example of an organic ligand with a ligand hole-trap distance of 1 carbon atom is benzenethiol, since the first carbon atom (attached to sulfur) is part of a benzene ring which means it is an aromatic carbon. An example of an organic ligand with a ligand hole-trap distance of 2 carbon atom is benzylamine, since the first carbon atom (attached to nitrogen) is in a single C—C bond, and the second carbon atom, in the direction away from the bond site, is part of a benzene ring which means it is an aromatic carbon.

Certain embodiments employ ligands on the first semiconductor nanoparticles, such that the ligands accept photoexcited holes from the dopant particles (from the second semiconductor nanoparticles). In these embodiments, preferably the second semiconductor nanoparticles also contain ligands that accept photoexcited holes from the dopant particles.

The number of first ligands per first semiconductor nanoparticle may vary widely, such as from 0 to 1000, e.g. about, at least about, or at most about 1, 2, 3, 4, 5, 6, 7, 8, 9, 10, 50, 100, 200, 300, 400, 500, 600, 700, 800, 900, or 1000, including any intervening range. In a given photochromic heterostructure, the total number of first ligands bonded to first semiconductor nanoparticles, divided by the total number of first semiconductor nanoparticles, gives the number of first ligands per first semiconductor nanoparticle.

The number of second ligands per second semiconductor nanoparticle may vary widely, such as from 0 to 1000, e.g. about, at least about, or at most about 1, 2, 3, 4, 5, 6, 7, 8, 9, 10, 50, 100, 200, 300, 400, 500, 600, 700, 800, 900, or 1000, including any intervening range. In a given photochromic heterostructure, the total number of second ligands bonded to second semiconductor nanoparticles, divided by the total number of second semiconductor nanoparticles, gives the number of second ligands per second semiconductor nanoparticle.

The concentration of first ligands within the photochromic heterostructure may vary, such as from 0 wt % to about 25 wt %. In various embodiments, the concentration of first ligands within the photochromic heterostructure is about, at least about, or at most about 0.01 wt %, 0.1 wt %, 0.2 wt %, 0.3 wt %, 0.4 wt %, 0.5 wt %, 1 wt %, 2 wt %, 3 wt %, 4 wt %, 5 wt %, 6 wt %, 7 wt %, 8 wt %, 9 wt %, 10 wt %, 15 wt %, 20 wt %, or 25 wt %, including any intervening range.

The concentration of second ligands within the photochromic heterostructure may vary, such as from 0 wt % to about 25 wt %. In various embodiments, the concentration of second ligands within the photochromic heterostructure is about, at least about, or at most about 0.01 wt %, 0.1 wt %, 0.2 wt %, 0.3 wt %, 0.4 wt %, 0.5 wt %, 1 wt %, 2 wt %, 3 wt %, 4 wt %, 5 wt %, 6 wt %, 7 wt %, 8 wt %, 9 wt %, 10 wt %, 15 wt %, 20 wt %, or 25 wt %, including any intervening range.

The concentration of total (first and second) ligands within the photochromic heterostructure may vary, such as from 0 wt % to about 50 wt %. In various embodiments, the total concentration of ligands within the photochromic heterostructure is about, at least about, or at most about 0.01 wt %, 0.1 wt %, 0.2 wt %, 0.3 wt %, 0.4 wt %, 0.5 wt %, 1 wt %, 2 wt %, 3 wt %, 4 wt %, 5 wt %, 6 wt %, 7 wt %, 8 wt %, 9 wt %, 10 wt %, 15 wt %, 20 wt %, 25 wt %, 30 wt %, 35 wt %, 40%, 45 wt %, or 50 wt %, including any intervening range.

There may be various types of bonds between ligands and semiconductor nanoparticles, including chemical bonds (e.g., ionic bonds, covalent bonds, or metallic bonds), which may also be referred to as chemisorption of ligands on semiconductor nanoparticles. Alternatively, or additionally, there may be physisorption of ligands on semiconductor nanoparticles. Physisorption may arise from the van der Waals force, a distance-dependent interaction between atoms or molecules. Unlike ionic or covalent bonds, van der Waals attractions do not result from a chemical electronic bond.

In some embodiments, the photochromic heterostructure contains a redox agent that is capable of changing an oxidation state of one or more transition metals.

In some embodiments, the first semiconductor nanoparticles and the second semiconductor nanoparticles are surrounded by a matrix. The matrix may be an organic matrix, an inorganic matrix, or a hybrid organic-inorganic matrix.

The matrix, when used, may be present at a matrix concentration selected from about 1 wt % to about 90 wt % on the basis of total weight of the photochromic heterostructure. In various embodiments, the matrix concentration is about, at least about, or at most about 1 wt %, 2 wt %, 5 wt %, 10 wt %, 15 wt %, 20 wt %, 25 wt %, 30 wt %, 40 wt %, 50 wt %, 60 wt %, 70 wt %, 80 wt %, or 90 wt %, including any intervening range.

In various embodiments, the matrix surrounding the first and second semiconductor nanoparticles is or contains an organic polymer, an organic electrolyte, or a combination thereof, for example.

In some embodiments using electrolyte polymers in the matrix, electrolyte polymers allow electrochemical tuning of the dopant oxidation state if a potential is held across the matrix. Electrolyte polymers for the matrix may be selected from polyethylene oxide, polypropylene oxide, polycarbonates, or polysiloxanes, for example.

An electrolyte polymer may be a polyethylene oxide complex formed with a metal salt, such as PEO-Cu$(CF_3SO_3)_2$ which is a Cu-ion conductor according to Bonino et al., "Electrochemical properties of copper-based polymer electrolytes" *Electrochimica Acta*, Volume 37, Issue 9, Pages 1711-1713 (1992), which is incorporated by reference.

A gel electrolyte may be utilized, such as a liquid electrolyte (aqueous or non-aqueous solvent+salt) in a polymer host, in the matrix. Liquid electrolyte solvents in a gel electrolyte may be water, dimethyl carbonate, diethyl carbonate, propylene carbonate, ethylene carbonate, γ-butyrolactone, or a combination thereof, for example. Salts in a gel electrolyte may be salts of any of transition metals, metalloids, alkali metals, or alkaline earth metals. For example, the gel electrolyte may use salts of V, Ti, Cr, Co, Ni, Cu, Zn, Tb, W, Ag, Cd, Au, Al, Ga, Ge, As, Se, Sn, Sb, Te, Bi, Li, Na, K, Mg, Ca, or a combination thereof.

Alternatively, or additionally, the matrix surrounding the first and second semiconductor nanoparticles may be or contain an inorganic oxide. An inorganic oxide may be selected from the group consisting of $SiO_2$, ZnO, $Al_2O_3$, $ZrO_2$, and combinations thereof, for example.

The matrix surrounding the first and second semiconductor nanoparticles may be or contain a solid electrolyte. For example, the solid electrolyte may be selected from oxide-based electrolytes, such as β-alumina, Cu-β-alumina, Ag-β-alumina, or a combination thereof. The solid electrolyte may be selected from sulfide-based electrolytes, such as $Li_{10}GeP_2S_{12}$, $Na_2S$—$P_2S_5$, $Li_2S$—$P_2S_5$, or a combination thereof. The solid electrolyte may be selected from LiSiCON, i.e. lithium superionic conductor, which refers to a family of solids with the chemical formula $Li_{2+2x}Zn_{1-x}GeO_4$ (−0.5<x<1). The solid electrolyte may be selected from cuprous halides, such as CuCl, CuBr, CuI, or a combination thereof. The solid electrolyte may be a copper sulfide, such as $Cu_{2-\alpha}S$ (0≤α≤1). The solid electrolyte may be or include a $Ag^+$ conductor, such as AgI (0.1 S/cm at 150° C.), AgI—$Ag_2SeO_4$, $RbAg_4I_5$, or a combination thereof.

Some embodiments can be understood with reference to FIG. 1, which depicts an exemplary photochromic heterostructure 100 (not drawn to scale) and is a two-dimensional representation of a three-dimensional object. In FIG. 1, the photochromic heterostructure 100 comprises a first semiconductor nanoparticle 110, and optional ligands 120 bonded to the semiconductor nanoparticle 110; and a second semiconductor nanoparticle 150, transition-metal dopant particles 160 disposed on surfaces of, and/or within, the semiconductor nanoparticle 150, and optional ligands 170 bonded to the semiconductor nanoparticle 150. The first semiconductor nanoparticle 110 and the second semiconductor nanoparticle 150 are in physical contact with each other, forming a photochromic nanoparticle pair. The number of transition-metal dopant particles 160 and the number of ligands 120/170 (if any) may vary; the specific numbers shown in FIG. 1 are only for purposes of illustration. In typical embodiments of a photochromic heterostructure, there would be a plurality of first semiconductor nanoparticles 110 and a plurality of second semiconductor nanoparticle 150, not just a two total semiconductor nanoparticles 110/150 (e.g., see FIG. 2). The transition-metal dopant particles 160 that are shown within the circle representing the second semiconductor nanoparticle 150 can be regarded as either attached to the outer surface of the second semiconductor nanoparticle 150, or disposed within the second semiconductor nanoparticle 150 (i.e., within an internal phase of that nanoparticle). The ligand 170 at about the 11 o'clock position is behind (obscured by) the transition-metal dopant particle 160, and is not chemically bonded to the transition-metal dopant particle 160. The transition-metal dopant particles 160 are by no means limited to an aspect ratio of 1:6 (diameter of a metal dopant particle 160 divided by diameter of semiconductor nanoparticle 110) as implied in FIG. 1. Also, the molecular size of the ligands 170 may vary. The ligands 170 are by no means limited to an aspect ratio of 1:1 with the transition-metal dopant particles 160 (outward length of a ligand 170 divided by diameter a metal dopant particle 160). The ligand 170 will generally take a molecular shape (e.g., linear or bent) dictated by local bonding and electrostatic forces. The first semiconductor nanoparticle 110, the second semiconductor nanoparticle 150, and the transition-metal dopant particles 160 are not necessarily spherical as illustrated in FIG. 1.

Figure 2:
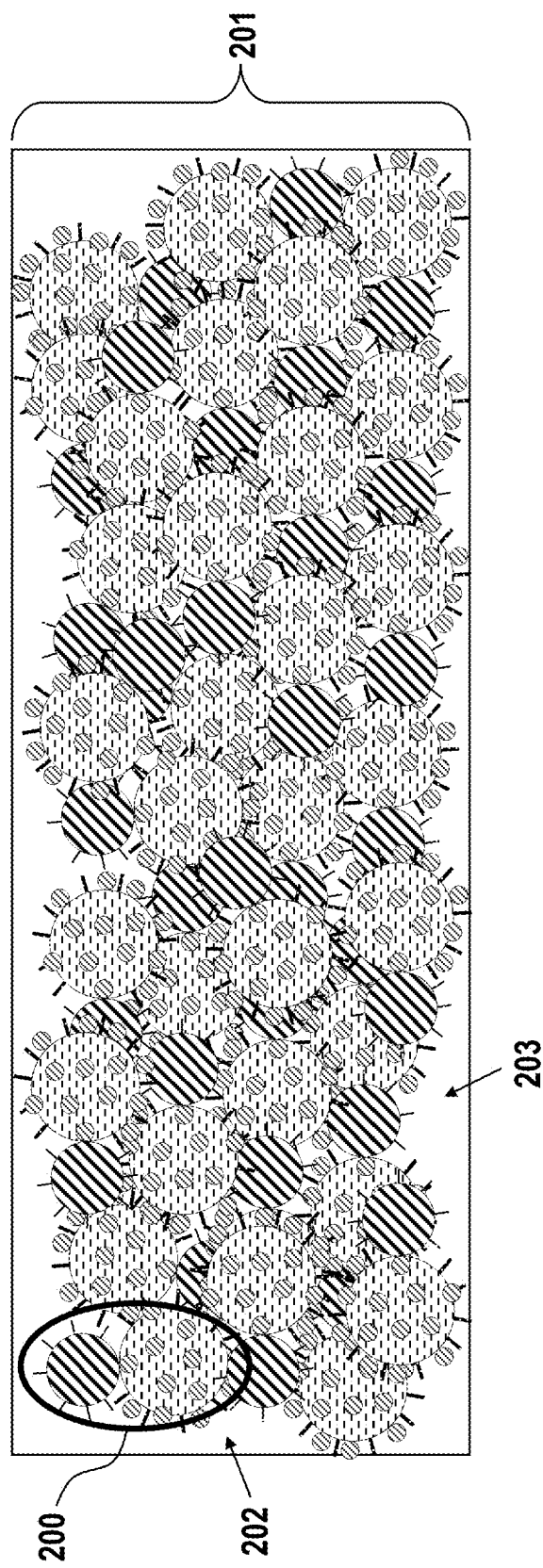
FIG. 2 depicts an exemplary photochromic heterostructure containing a plurality of photochromic nanoparticle pairs, each comprising a first semiconductor nanoparticle; a second semiconductor nanoparticle; transition-metal dopant particles disposed on surfaces of, and/or within, the second semiconductor nanoparticles; optional first ligands bonded to the first semiconductor nanoparticles; and optional second ligands bonded to the second semiconductor nanoparticles.

Some embodiments can be understood with reference to FIG. 2, which depicts an exemplary photochromic heterostructure. FIG. 2 is not drawn to scale and is a two-dimensional representation (side view) of a three-dimensional object. In FIG. 2, the photochromic heterostructure contains a plurality of photochromic nanoparticle pairs 200, which are shown in zoomed-in form in FIG. 1. In particular, FIG. 1 depicts a single photochromic nanoparticle pair 100, while FIG. 2 depicts many photochromic nanoparticle pairs 200. Each photochromic nanoparticle pair 200 comprises a first semiconductor nanoparticle; a second semiconductor nanoparticle; transition-metal dopant particles disposed on surfaces of, and/or within, the second semiconductor nanoparticles; optional first ligands bonded to the first semiconductor nanoparticles; and optional second ligands bonded to the second semiconductor nanoparticles. For clarity, the individual elements of each photochromic nanoparticle pair 200 are not labeled in FIG. 2 but are labeled in FIG. 1. The photochromic nanoparticle pairs 200 are surrounded by a matrix 202, which may contain an organic material, an inorganic material, or a combination thereof. The matrix 202 may go between the ligands (if present) and may touch the dopant particles, if the matrix is well-mixed. Alternatively, the matrix 202 may surround the outer tips of the ligands (if present) but not penetrate all the way to the semiconductor nanoparticles, forming a matrix bubble (of vacuum or gas) around each nanoparticle or nanoparticle pair. An optional redox-labile species 203 may be disposed within the photochromic heterostructure, in spaces around or between the photochromic nanoparticle pairs 200. If present, the redox-labile species 203 may be disposed within the matrix 202, or the redox-labile species 203 may be in a separate phase, such as within porous regions of the matrix 202. If used, the redox-labile species 203 is transported (e.g., by diffusion or permeation) to the transition-metal dopant particles within the photochromic nanoparticle pairs 200. The photochromic nanoparticle pairs 200 collectively form a photochromic region 201. In the photochromic region 201, adjacent photochromic nanoparticle pairs 200 are physically touching each other. In other embodiments, there are matrix regions between some or all adjacent photochromic nanoparticle pairs 200.

Figure 3:
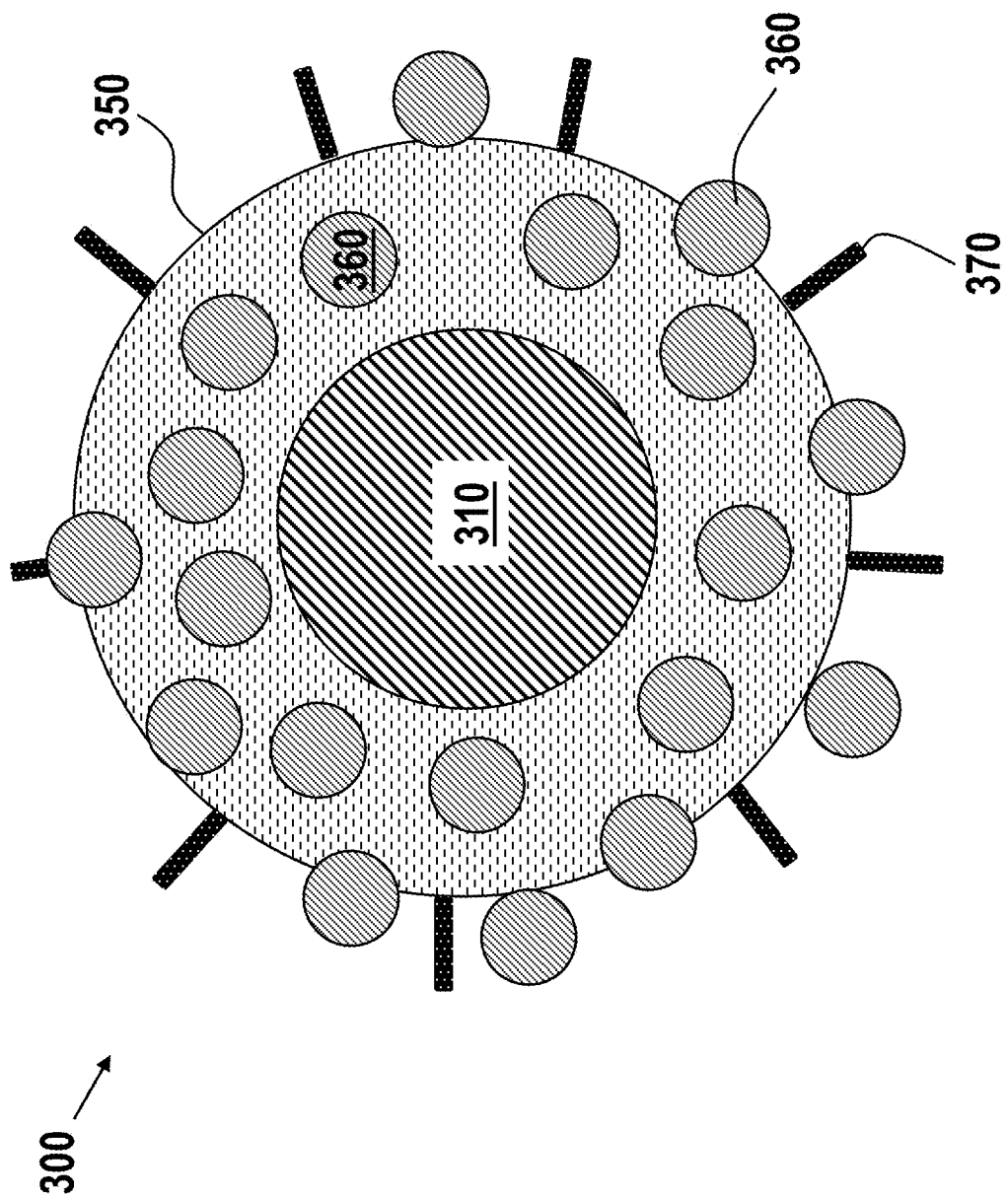
FIG. 3 depicts an exemplary photochromic heterostructure in the form of a core-shell assembly, in some embodiments of the invention.

Some embodiments can be understood with reference to FIG. 3, which depicts an exemplary photochromic heterostructure 300 (not drawn to scale) and is a two-dimensional representation of a three-dimensional object. In FIG. 3, the photochromic heterostructure 300 comprises a first semiconductor nanoparticle 310 in the form of a core; a second semiconductor nanoparticle 350 in the form of a spherical shell surrounding the core (first semiconductor nanoparticle 310), transition-metal dopant particles 360 disposed on surfaces of, and/or within, the second semiconductor nanoparticle 350, and optional ligands 370 bonded to the second semiconductor nanoparticle 350. The first semiconductor nanoparticle 310 and the second semiconductor nanoparticle 350 are in physical contact with each other, forming a photochromic nanoparticle core-shell assembly. The number of transition-metal dopant particles 360 and the number of ligands 370 (if any) may vary; the specific numbers shown in FIG. 3 are only for purposes of illustration. In typical embodiments of a photochromic heterostructure, there would be a plurality of photochromic nanoparticle core-shell assemblies, not just one such assembly (e.g., see FIG. 4). The transition-metal dopant particles 360 that are shown within the outer circle representing the second semiconductor nanoparticle 350 can be regarded as either attached to the outer surface of the second semiconductor nanoparticle 350, or disposed within the second semiconductor nanoparticle 350 (i.e., within an internal phase of that nanoparticle). The ligand 370 at about the 11:30 o'clock position is behind (obscured by) the transition-metal dopant particle 360, and is not chemically bonded to the transition-metal dopant particle 360. The transition-metal dopant particles 360 are by no means limited to an aspect ratio of 1:6 (diameter of a metal dopant particle 360 divided by outer diameter of second semiconductor nanoparticle 350) as implied in FIG. 3. Also, the molecular size of the ligands 370 may vary. The ligands 370 are by no means limited to an aspect ratio of 1:1 with the transition-metal dopant particles 360 (outward length of a ligand 370 divided by diameter a metal dopant particle 360). The ligand 370 will generally take a molecular shape (e.g., linear or bent) dictated by local bonding and electrostatic forces. The first semiconductor nanoparticle 310, the second semiconductor nanoparticle 350, and the transition-metal dopant particles 360 are not necessarily spherical as illustrated in FIG. 1.

Figure 4:
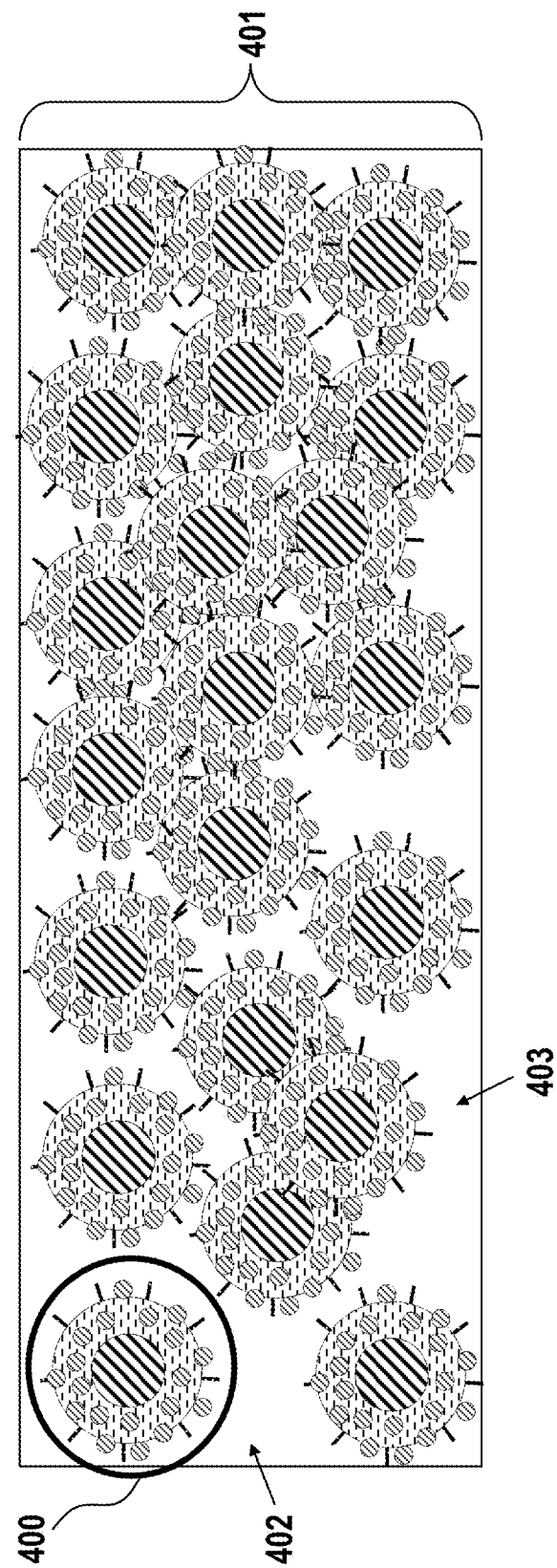
FIG. 4 depicts an exemplary photochromic heterostructure containing a plurality of photochromic nanoparticle core-shell assemblies, each comprising a first semiconductor nanoparticle in the form of a core; a second semiconductor nanoparticle in the form of a spherical shell surrounding the core (first semiconductor nanoparticle), transition-metal dopant particles disposed on surfaces of, and/or within, the second semiconductor nanoparticle, and optional ligands bonded to the second semiconductor nanoparticle.

Some embodiments can be understood with reference to FIG. 4, which depicts an exemplary photochromic heterostructure. FIG. 4 is not drawn to scale and is a two-dimensional representation (side view) of a three-dimensional object. In FIG. 4, the photochromic heterostructure contains a plurality of photochromic nanoparticle core-shell assemblies 400, which are shown in zoomed-in form in FIG. 3. In particular, FIG. 3 depicts a single photochromic nanoparticle core-shell assembly 300, while FIG. 4 depicts many photochromic nanoparticle core-shell assemblies 400. Each photochromic nanoparticle core-shell assembly 400 comprises a first semiconductor nanoparticle in the form of a core; a second semiconductor nanoparticle in the form of a spherical shell surrounding the core (first semiconductor nanoparticle), transition-metal dopant particles disposed on surfaces of, and/or within, the second semiconductor nanoparticle, and optional ligands bonded to the second semiconductor nanoparticle. For clarity, the individual elements of each photochromic nanoparticle core-shell assembly 400 are not labeled in FIG. 4 but are labeled in FIG. 3. The photochromic nanoparticle core-shell assemblies 400 are surrounded by a matrix 402, which may contain an organic material, an inorganic material, or a combination thereof. The matrix 402 may go between the ligands (if present) and may touch the dopant particles, if the matrix is well-mixed. Alternatively, the matrix 402 may surround the outer tips of the ligands (if present) but not penetrate all the way to the second semiconductor nanoparticles (the shells), forming a matrix bubble (of vacuum or gas) around each photochromic nanoparticle core-shell assembly 400. An optional redox-labile species 403 may be disposed within the photochromic heterostructure, in spaces around or between the photochromic nanoparticle core-shell assemblies 400. If present, the redox-labile species 403 may be disposed within the matrix 402, or the redox-labile species 403 may be in a separate phase, such as within porous regions of the matrix 402. If used, the redox-labile species 403 is transported (e.g., by diffusion or permeation) to the transition-metal dopant particles within the shells of the photochromic nanoparticle core-shell assemblies 400. The photochromic nanoparticle core-shell assemblies 400 collectively form a photochromic region 401. In the photochromic region 401, most, but not all, adjacent photochromic nanoparticle pairs 400 are physically touching each other; thus there are matrix regions between some adjacent photochromic nanoparticle pairs 400. In some embodiments, all adjacent photochromic nanoparticle pairs 400 are physically touching each other. In other embodiments, there are matrix regions between all adjacent photochromic nanoparticle pairs 400.

In some embodiments, the photochromic heterostructure is contained within an electrochemical cell. An electrochemical cell can be used to carry out electrochemical reactions that enable a reversible redox mechanism. The photochromic heterostructure may be contained in an electrochemical cell in which electrodes in the cell change the oxidation state of redox agents that diffuse to the second nanoparticles and change the redox state of a dopant in the second nanoparticles. An electrochemical cell contains at least two electrodes (one positive and one negative electrode) and an electrolyte, in addition to the photochromic heterostructure. The electrodes may be configured as planar electrodes, which may be disposed on top of, and below, the photochromic region 201 of FIG. 2 or the photochromic region 401 of FIG. 4, for example. Electrodes may also be disposed within the photochromic regions.

In some embodiments of an electrochemical cell, the positive electrode and the negative electrode each contain an electrode material independently selected from the group consisting of platinum, gold, glassy carbon, graphite, stainless steel, tungsten, indium tin oxide, and combinations thereof. The material of the different electrodes may be the same or different. A conductive additive, such as carbon black, may be added to the positive electrode and/or the negative electrode. Optionally, a reference electrode may be used in the electrochemical cell, for monitoring the electrochemical state.

The electrolyte may include salts of any of transition metals, metalloids, alkali metals, or alkaline earth metals. For example, salts in the electrolyte may be salts of V, Ti, Cr, Co, Ni, Cu, Zn, Tb, W, Ag, Cd, Au, Al, Ga, Ge, As, Se, Sn, Sb, Te, Bi, Li, Na, K, Mg, Ca, or a combination thereof.

In some embodiments of an electrochemical cell, the electrolyte is selected from the group consisting of $LiSO_4$, $NaSO_4$, $KSO_4$, $LiCO_3$, KCl, and combinations thereof. In some embodiments, the first and second semiconductor nanoparticles are dissolved in the electrolyte. In this specification, "dissolved" nanoparticles include nanoparticles suspended within the electrolyte.

In some embodiments of an electrochemical cell, the electrochemical cell further includes an electrolyte solvent selected from the group consisting of water, dimethylformamide, dimethylsulfoxide, dimethyl carbonate, diethyl carbonate, propylene carbonate, ethylene carbonate, γ-butyrolactone, acetone, ethers, toluene, tetrahydrofuran, and combinations thereof.

All options, species types, species concentrations, and other selections, conditions, and parameters described above in reference to the photochromic heterostructure are also applicable to an electrochemical cell that contains a photochromic heterostructure.

Other variations of the invention provide a darkening article comprising:

(A) a photochromic heterostructure comprising:

first semiconductor nanoparticles that have an average first-nanoparticle effective diameter from about 1 nanometer to about 20 nanometers, wherein the first semiconductor nanoparticles are not doped, and wherein the first semiconductor nanoparticles have a first bandgap energy; and second semiconductor nanoparticles that have an average second-nanoparticle effective diameter from about 1 nanometer to about 60 nanometers, wherein the second semiconductor nanoparticles are doped with one or more transition metals, and wherein the second semiconductor nanoparticles have a second bandgap energy, wherein the first bandgap energy is lower than the second bandgap energy, and wherein the first semiconductor nanoparticles and the second semiconductor nanoparticles are in physical contact with each other;

(B) ligands bonded to the first semiconductor nanoparticles and/or to the second semiconductor nanoparticles; and (C) a matrix surrounding the first semiconductor nanoparticles and the second semiconductor nanoparticles, wherein the first semiconductor nanoparticles are capable of being photoexcited with light below the bandgap energy of the second semiconductor nanoparticles, to create a photoexcited hole, wherein the second semiconductor nanoparticles are capable of receiving the photoexcited hole in a dopant energy orbital, to create a new absorption, and wherein the photoexcited hole is trappable in the ligands and/or in the matrix, to reverse photochromism of the photochromic heterostructure.

Certain variations of the invention provide a darkening article comprising:

(A) a photochromic heterostructure comprising:

first semiconductor nanoparticles that have an average first-nanoparticle effective diameter from about 1 nanometer to about 20 nanometers, wherein the first semiconductor nanoparticles are not doped, and wherein the first semiconductor nanoparticles have a first bandgap energy; and second semiconductor nanoparticles that have an average second-nanoparticle effective diameter from about 1 nanometer to about 60 nanometers, wherein the second semiconductor nanoparticles are doped with one or more transition metals, and wherein the second semiconductor nanoparticles have a second bandgap energy, wherein the first bandgap energy is lower than the second bandgap energy, and wherein the first semiconductor nanoparticles and the second semiconductor nanoparticles are in physical contact with each other; and (B) ligands bonded to the first semiconductor nanoparticles and/or to the second semiconductor nanoparticles;

wherein the first semiconductor nanoparticles are capable of being photoexcited with light below the bandgap energy of the second semiconductor nanoparticles, to create a photoexcited hole, wherein the second semiconductor nanoparticles are capable of receiving the photoexcited hole in a dopant energy orbital, to create a new absorption, and wherein the photoexcited hole is trappable in the ligands, to reverse photochromism of the photochromic heterostructure.

Certain variations of the invention provide a darkening article comprising:

(A) a photochromic heterostructure comprising:

first semiconductor nanoparticles that have an average first-nanoparticle effective diameter from about 1 nanometer to about 20 nanometers, wherein the first semiconductor nanoparticles are not doped, and wherein the first semiconductor nanoparticles have a first bandgap energy; and second semiconductor nanoparticles that have an average second-nanoparticle effective diameter from about 1 nanometer to about 60 nanometers, wherein the second semiconductor nanoparticles are doped with one or more transition metals, and wherein the second semiconductor nanoparticles have a second bandgap energy, wherein the first bandgap energy is lower than the second bandgap energy, and wherein the first semiconductor nanoparticles and the second semiconductor nanoparticles are in physical contact with each other; and (B) a matrix surrounding the first semiconductor nanoparticles and the second semiconductor nanoparticles, wherein the first semiconductor nanoparticles are capable of being photoexcited with light below the bandgap energy of the second semiconductor nanoparticles, to create a photoexcited hole, wherein the second semiconductor nanoparticles are capable of receiving the photoexcited hole in a dopant energy orbital, to create a new absorption, and wherein the photoexcited hole is trappable in the matrix, to reverse photochromism of the photochromic heterostructure.

All options, species types, species concentrations, and other selections, conditions, and parameters described above in reference to the photochromic heterostructure are also applicable to a darkening article that includes a photochromic heterostructure.

In some embodiments of a darkening article, the photochromic heterostructure comprises a plurality of core-shell structures, wherein each of the core-shell structures contains a core of the first semiconductor nanoparticles, and a shell of the second semiconductor nanoparticles. See, for example, FIGS. 3 and 4, discussed above.

In some embodiments of a darkening article, adjacent core-shell structures are in physical contact with each other. Note that due to the core-shell structures, every first semiconductor nanoparticle (core) is in physical contact with a second semiconductor nanoparticle (shell). Adjacent core-shell structures may or may not be physically touching, i.e., the second semiconductor nanoparticle (shell) may or may not be in physical contact with another second semiconductor nanoparticle (a separate shell). In FIG. 4, for example, some but not all of the adjacent core-shell assemblies are touching each other.

In some embodiments of a darkening article, each of the first semiconductor nanoparticles and the second semiconductor nanoparticles are independently selected from the group consisting of single-element nanoparticles, two-element nanoparticles, three-element nanoparticles, four-element nanoparticles, and combinations thereof.

In certain embodiments of a darkening article, the single-element nanoparticles are selected from the group consisting of Si, Ge, and combinations thereof.

In certain embodiments of a darkening article, the two-element nanoparticles are selected from the group consisting of ZnS, ZnSe, ZnTe, CdS, CdSe, CdTe, PbS, PbSe, PbTe, InP, InAs, InSb, GaP, GaAs, $Ag_2S$, $Ag_2Se$, $Ag_2Te$, and combinations thereof.

In certain embodiments of a darkening article, the three-element nanoparticles are selected from the group consisting of $Zn_xCd_{1-x}S$, $Zn_xCd_{1-x}Se$, $Zn_xCd_{1-x}Te$, $Zn_xPb_{1-x}S$, $Zn_xPb_{1-x}Se$, $Zn_xPb_{1-x}Te$, $Zn_xSn_{1-x}S$, $Zn_xSn_{1-x}Se$, $Zn_xSn_{1-x}Te$, $Pb_xSn_{1-x}S$, $Pb_xSn_{1-x}Se$, $Pb_xSn_{1-x}Te$, $In_xGa_{1-x}P$, $In_xGa_{1-x}As$, $Ag_{2x}Cd_{1-x}S$, $Ag_{2x}Cd_{1-x}Se$, $Ag_{2x}Cd_{1-x}Te$, $Ag_{2x}Pb_{1-x}S$, $Ag_{2x}Pb_{1-x}Se$, $Ag_{2x}Pb_{1-x}Te$, $Ag_{2x}Sn_{1-x}S$, $Ag_{2x}Sn_{1-x}Se$, $Ag_{2x}Sn_{1-x}Te$, and combinations thereof, wherein $0<x<1$.

In some embodiments of a darkening article, the first semiconductor nanoparticles are compositionally different than the second semiconductor nanoparticles. In certain embodiments, the first semiconductor nanoparticles are compositionally the same as the second semiconductor nanoparticles, except for the dopant in the second semiconductor nanoparticles.

In some embodiments of a darkening article, one or more transition metals are selected from the group consisting of Cu, Fe, Ag, Eu, and combinations thereof.

In some embodiments of a darkening article, the one or more transition metals are incorporated into a crystal lattice of the second semiconductor nanoparticles. In other embodiments, the one or more transition metals are incorporated on surfaces of the second semiconductor nanoparticles. In certain embodiments of a darkening article, the transition metals are incorporated both into a crystal lattice of, and on surfaces of, the second semiconductor nanoparticles.

In some embodiments of a darkening article, the ligands contain a carboxylate functional group, a thiol functional group, an amine functional group, or a combination thereof.

The ligands may be bonded to the first semiconductor nanoparticles, to the second semiconductor nanoparticles, or to both first and second semiconductor nanoparticles. Different types of ligands may be bonded to different types of nanoparticles. For example, first ligands may be bonded to the first semiconductor nanoparticles, while second ligands may be bonded to the second semiconductor nanoparticles.

The matrix may be an organic matrix, an inorganic matrix, or a hybrid organic-inorganic matrix. Composition options for the matrix are discussed earlier, in reference to photochromic heterostructures.

In some embodiments of a darkening article, the photochromic heterostructure contains a redox agent that is capable of changing an oxidation state of the one or more transition metals.

Other variations provide a photochromic system with an on/off switch, wherein the photochromic system comprises:

(i) a photochromic heterostructure comprising:

(a) first semiconductor nanoparticles that have an average first-nanoparticle effective diameter from about 1 nanometer to about 20 nanometers, wherein the first semiconductor nanoparticles are not doped, and wherein the first semiconductor nanoparticles have a first bandgap energy;

(b) second semiconductor nanoparticles that have an average second-nanoparticle effective diameter from about 1 nanometer to about 60 nanometers, wherein the second semiconductor nanoparticles are doped with one or more transition metals, and wherein the second semiconductor nanoparticles have a second bandgap energy, wherein the first bandgap energy is lower than the second bandgap energy, and wherein the first semiconductor nanoparticles and the second semiconductor nanoparticles are in physical contact with each other;

(c) ligands bonded to the first semiconductor nanoparticles and/or to the second semiconductor nanoparticles; and (d) a matrix surrounding the first semiconductor nanoparticles and the second semiconductor nanoparticles, wherein the first semiconductor nanoparticles are capable of being photoexcited with light below the bandgap energy of the second semiconductor nanoparticles, to create a photoexcited hole, wherein the second semiconductor nanoparticles are capable of receiving the photoexcited hole in a dopant energy orbital, to create a new absorption, and wherein the photoexcited hole is trappable in the ligands and/or in the matrix, to reverse photochromism of the photochromic heterostructure; and (ii) an on/off switch configured to reversibly activate the photochromic heterostructure, wherein the on/off switch is disposed in electrical or electrochemical communication with the photochromic heterostructure.

Certain variations provide a photochromic system with an on/off switch, wherein the photochromic system comprises:

(i) a photochromic heterostructure comprising:

(a) first semiconductor nanoparticles that have an average first-nanoparticle effective diameter from about 1 nanometer to about 20 nanometers, wherein the first semiconductor nanoparticles are not doped, and wherein the first semiconductor nanoparticles have a first bandgap energy;

(b) second semiconductor nanoparticles that have an average second-nanoparticle effective diameter from about 1 nanometer to about 60 nanometers, wherein the second semiconductor nanoparticles are doped with one or more transition metals, and wherein the second semiconductor nanoparticles have a second bandgap energy, wherein the first bandgap energy is lower than the second bandgap energy, and wherein the first semiconductor nanoparticles and the second semiconductor nanoparticles are in physical contact with each other; and (c) ligands bonded to the first semiconductor nanoparticles and/or to the second semiconductor nanoparticles, wherein the first semiconductor nanoparticles are capable of being photoexcited with light below the bandgap energy of the second semiconductor nanoparticles, to create a photoexcited hole, wherein the second semiconductor nanoparticles are capable of receiving the photoexcited hole in a dopant energy orbital, to create a new absorption, and wherein the photoexcited hole is trappable in the ligands, to reverse photochromism of the photochromic heterostructure; and (ii) an on/off switch configured to reversibly activate the photochromic heterostructure, wherein the on/off switch is disposed in electrical or electrochemical communication with the photochromic heterostructure.

Certain variations provide a photochromic system with an on/off switch, wherein the photochromic system comprises:

(i) a photochromic heterostructure comprising:

(a) first semiconductor nanoparticles that have an average first-nanoparticle effective diameter from about 1 nanometer to about 20 nanometers, wherein the first semiconductor nanoparticles are not doped, and wherein the first semiconductor nanoparticles have a first bandgap energy;

(b) second semiconductor nanoparticles that have an average second-nanoparticle effective diameter from about 1 nanometer to about 60 nanometers, wherein the second semiconductor nanoparticles are doped with one or more transition metals, and wherein the second semiconductor nanoparticles have a second bandgap energy, wherein the first bandgap energy is lower than the second bandgap energy, and wherein the first semiconductor nanoparticles and the second semiconductor nanoparticles are in physical contact with each other; and (c) a matrix surrounding the first semiconductor nanoparticles and the second semiconductor nanoparticles, wherein the first semiconductor nanoparticles are capable of being photoexcited with light below the bandgap energy of the second semiconductor nanoparticles, to create a photoexcited hole, wherein the second semiconductor nanoparticles are capable of receiving the photoexcited hole in a dopant energy orbital, to create a new absorption, and wherein the photoexcited hole is trappable in the matrix, to reverse photochromism of the photochromic heterostructure; and (ii) an on/off switch configured to reversibly activate the photochromic heterostructure, wherein the on/off switch is disposed in electrical or electrochemical communication with the photochromic heterostructure.

All options, species types, species concentrations, and other selections, conditions, and parameters described above in reference to the photochromic heterostructure are also applicable to a photochromic system with an on/off switch.

In some embodiments of the photochromic system, the on/off switch is configured to apply an electric field to the first and second semiconductor nanoparticles. The electric field may be provided by one or more electrodes disposed in electrical communication with the first and second semiconductor nanoparticles. The one or more electrodes may include sheet electrodes, wire-grid electrodes, or a combination thereof. The material of the one or more electrodes may be or include conducting metal oxide electrodes, conducting polymer electrodes, or a combination thereof. In some embodiments, the electric field is configured to quench emissive electron-hole recombination.

In some embodiments of the photochromic system, the on/off switch is configured to apply an electrochemical potential to the first and second semiconductor nanoparticles. An electrochemical potential means that there is a potential difference between two half cells in the photochromic system, wherein the potential difference is caused by the ability of electrons to flow from one half cell to the other. The electrochemical potential may be provided by one or more electrodes disposed in electrochemical communication with the semiconductor nanoparticles. The one or more electrodes may include sheet electrodes, wire-grid electrodes, or a combination thereof. In other embodiments, there is a flow of electrolytes without an electrical power supply, to establish an electrochemical potential applied to the first and second semiconductor nanoparticles.

In some embodiments of the photochromic system, the on/off switch is configured to electrochemically oxidize or reduce the transition-metal dopant particles in the second semiconductor nanoparticles. In the on state, the transition-metal dopant particles are electrochemically oxidized, causing an electron to be lost from an orbital, thereby creating a hole. In the off state, the transition-metal dopant particles are electrochemically reduced, causing an electron to be gained. The on/off switch thus enables a reversible redox reaction of the transition-metal dopant particles. In these embodiments, the on/off switch may utilize electrodes with or without electrolytes, or electrolytes with no electrodes—e.g. redox electrolyte-aided hybrid energy-storage systems.

In some embodiments of the photochromic system, the on/off switch is configured to optically oxidize or reduce the transition-metal dopant particles in the second semiconductor nanoparticles. In the on state, the transition-metal dopant particles are optically oxidized, using one or more photons to cause an electron to be lost from an orbital, thereby creating a hole. In the off state, the transition-metal dopant particles are optically reduced, allowing an electron to be gained while emitting one or more photons. The optical on/off switch thus enables a reversible redox reaction of the transition-metal dopant particles.

In some embodiments of the photochromic system, the on/off switch is configured to prevent the transition-metal dopant particles from changing their oxidation state, thereby shutting down the photochromism. In these embodiments, the on/off switch may utilize an electric field, an electrochemical field, and/or an optical field applied to the second semiconductor nanoparticles to minimize changes to dopant-particle oxidation states, or prevent changes to dopant-particle oxidation states, which turns off the photochromic function of the system.

In some embodiments, the photochromic system is characterized in that accepting transfer of the photoexcited hole takes place on a time scale of about 1 second or less. In various embodiments, the photochromic system is characterized in that accepting transfer of the photoexcited hole takes place on a time scale of about, or at most about, 1000, 900, 800, 700, 600, 500, 400, 300, 250, 200, 150, 100, 75, 50, 40, 30, 20, 10, or 5 milliseconds (ms), including any intervening range.

In some embodiments, the photochromic system is characterized in that when the photochromic system is in the off state, the photochromic system allows greater than 90% transmission of incident visible or infrared light with energy below a bandgap of the second semiconductor nanoparticles. In various embodiments, in the off state, the percent transmission of incident visible or infrared light with energy below a bandgap of the second semiconductor nanoparticles is about, or at least about, 80%, 85%, 90%, 91%, 92%, 93%, 94%, 95%, 96%, 97%, 98%, 99%, or 100%, including any intervening ranges.

An energy below a bandgap of the second semiconductor nanoparticles will depend on the specific second nanoparticles employed. For example, in the case of the second semiconductor nanoparticles being ZnSe, zinc selenide is known to have a bandgap of 2.70 eV. Light with at least this energy, which corresponds to a wavelength of 459 nm, will cause electrons in ZnSe to jump from the valence band to the conduction band. Thus, in this particular case, incident visible or infrared light with energy below the ZnSe bandgap will be light having a wavelength greater than 459 nm, such as light in the IR spectrum.

In some embodiments, the photochromic system is characterized in that when the photochromic system is in the on state, the photochromic composition allows less than 20% transmission of incident visible or infrared light with energy below the bandgap of the semiconductor nanoparticles. In various embodiments, in the on state, the percent transmission of incident visible or infrared light with energy below a bandgap of the second semiconductor nanoparticles is about, or at most about, 20%, 15%, 10%, 9%, 8%, 7%, 6%, 5%, 4%, 3%, 2%, 1%, or 0%, including any intervening ranges.

Other variations provide a method of controlling photochromism in a photochromic heterostructure, comprising:
(a) photoexciting first semiconductor nanoparticles with light above the bandgap energy of the first semiconductor nanoparticles and below the bandgap energy of second semiconductor nanoparticles that are present in a photochromic heterostructure with the first semiconductor nanoparticles;
(b) moving photoexcited holes into the dopant energy orbital of the second semiconductor nanoparticles, to create a new absorption; and
(c) trapping the photoexcited holes in ligands attached to the first semiconductor nanoparticles, ligands attached to the second semiconductor nanoparticles, in free molecules in a matrix surrounding the first and second semiconductor nanoparticles, or a combination thereof, to reverse the photochromism.

Some variations provide a method of reversing photochromism of a photochromic heterostructure, the method comprising:
(i) providing a photochromic heterostructure comprising: (a) first semiconductor nanoparticles that have an average first-nanoparticle effective diameter from about 1 nanometer to about 20 nanometers, wherein the first semiconductor nanoparticles are not doped, and wherein the first semiconductor nanoparticles have a first bandgap energy; (b) second semiconductor nanoparticles that have an average second-nanoparticle effective diameter from about 1 nanometer to about 60 nanometers, wherein the second semiconductor nanoparticles are doped with one or more transition metals, and wherein the second semiconductor nanoparticles have a second bandgap energy, wherein the first bandgap energy is lower than the second bandgap energy, and wherein the first semiconductor nanoparticles and the second semiconductor nanoparticles are in physical contact with each other; (c) ligands bonded to the first semiconductor nanoparticles and/or to the second semiconductor nanoparticles; and (d) a matrix surrounding the first semiconductor nanoparticles and the second semiconductor nanoparticles;
(ii) photoexciting at least some of the first semiconductor nanoparticles, thereby creating a plurality of photoexcited holes;
(iii) moving at least some of the plurality of photoexcited holes into an atomic orbital associated with the one or more transition metals in the second semiconductor nanoparticles, thereby generating dopant-contained holes; and
(iv) trapping at least some of the dopant-contained holes in the ligands and/or in the matrix, thereby reversing photochromism of the photochromic heterostructure.

Certain variations provide a method of reversing photochromism of a photochromic heterostructure, the method comprising:
(i) providing a photochromic heterostructure comprising: (a) first semiconductor nanoparticles that have an average first-nanoparticle effective diameter from about 1 nanometer to about 20 nanometers, wherein the first semiconductor nanoparticles are not doped, and wherein the first semiconductor nanoparticles have a first bandgap energy; (b) second semiconductor nanoparticles that have an average second-nanoparticle effective diameter from about 1 nanometer to about 60 nanometers, wherein the second semiconductor nanoparticles are doped with one or more transition metals, and wherein the second semiconductor nanoparticles have a second bandgap energy, wherein the first bandgap energy is lower than the second bandgap energy, and wherein the first semiconductor nanoparticles and the second semiconductor nanoparticles are in physical contact with each other; and (c) ligands bonded to the first semiconductor nanoparticles and/or to the second semiconductor nanoparticles;
(ii) photoexciting at least some of the first semiconductor nanoparticles, thereby creating a plurality of photoexcited holes;
(iii) moving at least some of the plurality of photoexcited holes into an atomic orbital associated with the one or more transition metals in the second semiconductor nanoparticles, thereby generating dopant-contained holes; and
(iv) trapping at least some of the dopant-contained holes in the ligands, thereby reversing photochromism of the photochromic heterostructure.

Certain variations provide a method of reversing photochromism of a photochromic heterostructure, the method comprising:
(i) providing a photochromic heterostructure comprising:
    (a) first semiconductor nanoparticles that have an average first-nanoparticle effective diameter from about 1 nanometer to about 20 nanometers, wherein the first semiconductor nanoparticles are not doped, and wherein the first semiconductor nanoparticles have a first bandgap energy; (b) second semiconductor nanoparticles that have an average second-nanoparticle effective diameter from about 1 nanometer to about 60 nanometers, wherein the second semiconductor nanoparticles are doped with one or more transition metals, and wherein the second semiconductor nanoparticles have a second bandgap energy, wherein the first bandgap energy is lower than the second bandgap energy, and wherein the first semiconductor nanoparticles and the second semiconductor nanoparticles are in physical contact with each other; and (c) a matrix surrounding the first semiconductor nanoparticles and the second semiconductor nanoparticles;
(ii) photoexciting at least some of the first semiconductor nanoparticles, thereby creating a plurality of photoexcited holes;
(iii) moving at least some of the plurality of photoexcited holes into an atomic orbital associated with the one or more transition metals in the second semiconductor nanoparticles, thereby generating dopant-contained holes; and
(iv) trapping at least some of the dopant-contained holes in the matrix, thereby reversing photochromism of the photochromic heterostructure.

All options, species types, species concentrations, and other selections, conditions, and parameters described above in reference to the photochromic heterostructure are also applicable to a method of reversing photochromism of a photochromic heterostructure.

In step (ii), photoexcitation of first semiconductor nanoparticles takes place at a wavelength that initiates the photochromic absorption effect (darkening). A wavelength that initiates (triggers) photochromic darkening may be in the visible spectrum, which is 400 nm to 750 nm for purposes of this specification. Alternatively, or additionally, a wavelength that initiates photochromic darkening may be in the infrared spectrum, which is 751 nm to 1 mm. A wavelength that initiates photochromic darkening may be in the near infrared (NIR) spectrum, which is 751 nm to 1400 nm. A wavelength that initiates photochromic darkening may be in the short-wavelength infrared (SWIR) spectrum, which is 1401 nm to 3000 nm. A wavelength that initiates photochromic darkening may be in the mid-wavelength infrared (MWIR) spectrum, which is 3001 nm to 8000 nm. A wavelength that initiates photochromic darkening may be in the long-wavelength infrared (LWIR) spectrum, which is 8001 nm to 15000 nm (15 μm). There may be multiple wavelengths (e.g., a range of wavelengths) that initiate photochromic darkening.

As stated earlier, the wavelengths that trigger the photochromic darkening can be different than the absorbed wavelengths from the photochromic effect. A wavelength that is absorbed during photochromic darkening may be in the visible spectrum, Alternatively, or additionally, a wavelength that is absorbed during photochromic darkening may be in the infrared spectrum. A wavelength that is absorbed during photochromic darkening may be in the NIR spectrum, the SWIR spectrum, the MWIR spectrum, and/or LWIR spectrum, for example. There may be multiple wavelengths (e.g., a range of wavelengths) that are absorbed during photochromic darkening.

In typical embodiments, the wavelength range that is absorbed during photochromic darkening is broader (wider) that the wavelength range that triggers the photochromic darkening. This feature results from the fact that the wavelength range that is absorbed to trigger darkening does not change when the particles darken, resulting in the darkened nanoparticle absorb a broader range of wavelengths. For example, Zn absorbs at wavelengths shorter than 350 nm; when Zn darkens, there is also absorption in the 400-900 nm range of wavelengths. The undark Zn particle absorbs only at <350 nm; the darkened particle still absorbs at <350 nm and additionally absorbs at 400-900 nm.

Photoexcitation of semiconductor nanoparticles in step (ii) is generally very fast, if incoming light has an energy greater than the bandgap energy of the semiconductor nanoparticles. A typical timescale of the photoexcitation is about 100 picoseconds to about 10 nanoseconds.

In step (iii), photoexcited holes in the first semiconductor nanoparticles move into an atomic orbital associated with the transition-metal dopant particles in the second semiconductor nanoparticles, thereby generating dopant-contained holes. A "dopant-contained hole" means an electron hole contained in an orbital of a dopant particle. Loss of an electron from the dopant particle creates a hole in the orbital of the dopant particle. The hole may be a light hole or a heavy hole. The exact electron orbital from which the electron moves out from the dopant particle may generally be predicted by quantum mechanics, although the present invention is not limited to the specific orbital(s) from which electrons may create holes. Tunneling or other phenomena may cause holes to be created in orbitals that are not predicted by a standard electron-configuration model—for example, a hole may be created in an orbital different than the least-stable orbital. Holes may dynamically hop around various orbitals prior to ultimately being fully transferred out of the electron cloud of the dopant particle. As one specific example, when the dopant particle is copper, a photoexcited electron may leave the 4s orbital or the 3d orbital of the copper atom.

In step (iii), the time scale of moving at least some of the photoexcited holes into an atomic orbital associated with the transition-metal dopant particles, may be about 1 second or less. In various embodiments, the time scale is about, or at most about, 1000, 900, 800, 700, 600, 500, 400, 300, 250, 200, 150, 100, 75, 50, 40, 30, 20, 10, or 5 milliseconds (ms), including any intervening range. Note that, typically, one photoexcited hole moves into one atomic orbital associated with one transition-metal dopant particle. It is possible for multiple photoexcited holes to move into a single atomic orbital of a transition-metal dopant particle.

In step (iv), the photochromic darkening effect is passively (automatically) reversed by trapping at least some (e.g., all) of the dopant-contained holes in ligands and/or in a matrix surrounding the semiconductor nanoparticles. This hole trapping reverses the photochromism of the photochromic heterostructure, from the photochromic state present after photoexciting the first semiconductor nanoparticles in step (ii) and/or after creating dopant-contained holes in step (iii).

In some methods, reversing photochromism in step (iv) takes place on a time scale of about 20 seconds or less. This time scale may also be referred to as the relaxation time or the photochromic reversal time. The relaxation time is measured in the solid state (not in solution) and is calculated as the time to achieve 90% reduction in the maximum photochromic darkening that occurs prior to step (iv). In various embodiments, the relaxation time for solid-state reversible chromatism in step (iv) is about, or at most about, 20, 19, 18, 17, 16, 15, 14, 13, 12, 11, 10, 9, 8, 7, 6, 5, 4, 3, 2, 1, 0.5, or 0.1 seconds, including any intervening range.

The maximum photochromic darkening that occurs prior to step (iv) refers to the phototransformation of the photochromic heterostructure in a state of maximum light absorption (or minimum light transmission) at a given wavelength. When multiple wavelengths are of interest, the photochromic reversal time may be a function of wavelength.

As an example to illustrate the calculation, after the photoexcited holes are transferred into atomic orbitals associated with the transition-metal dopant particles, there may be 95% light absorption at a wavelength of 1000 nm, at the peak of maximum light absorption. During step (iv), the photochromism may be completely reversed, to a state of 0% light absorption. The photochromic reversal time is calculated as the time at which the photochromic composition reaches 5% light absorption, since 95%–5%=90%. The photochromic reversal time in this example is calculated starting from the peak of 95% light absorption, or from the start of the peak if the composition maintains maximum photochromic darkening for an appreciable period of time.

The protection time that may pass from step (ii) to the start of step (iv) may vary. This protection time is dictated, at least in part, by the period of time for which the photoexciting light is impinging on the photochromic heterostructure, which in turn will be determined by the specific use of the photochromic heterostructure and environmental/external factors. The protection time may be very short, such as a UV light pulse on the order of seconds; or may be longer, such as minutes, hours, or even days or more. During the protection time, detinting does not effectively begin—i.e., protection continues due to the photochromic effect. (In reality, the semiconductor nanoparticles are darkening and relaxing the whole time; if the photoexciting light is still impinging, then as the semiconductor nanoparticles relax, they also absorb more light and oscillate to the darkened state. This process repeats many times until the photoexciting light is no longer exposed to the photochromic composition. The net macroscopic effect is that detinting does not begin until the photoexciting light is no longer impinging.)

The protection time is different than the photochromic reversal time. In some embodiments, the protection time is about the same as, or greater than, the photochromic reversal time. In other embodiments, the protection time is less than the photochromism reversal time. When the photochromism reversal starts, which starts the clock for the photochromic reversal time, some amount of photochromic protection may still exist.

Some methods further comprise reversibly activating the photochromic heterostructure utilizing an on/off switch disposed in electrical or electrochemical communication with the photochromic composition. In certain methods, the on/off switch applies an electric field to the semiconductor nanoparticles. In these or other methods, the on/off switch applies an electrochemical potential to the semiconductor nanoparticles. In certain methods, the on/off switch electrochemically oxidizes or reduces the transition-metal dopant particles.

The on/off function can be mediated by the application of an external bias. Typically, in molecular photochromics, the application of a potential moves molecular mass to induce a conformational change which results in the photochromic effect being controllable via an on/off switch. In embodiments of the disclosed technology, fast photochromic switching can be controlled similarly with bias by saturating the discretely tunable electronic levels of photochromic nanoparticles. The electric or electrochemical field necessary to quench or saturate the photochromic state on demand can be generated in multiple ways. In some embodiments, a deposited film is used to establish an electrical or electrochemical field on demand.

To preserve the optical and aesthetic quality of the deposited film, transparent metal-oxide films may be utilized to generate a uniform field across the substrate to passivate the photochromicity. Transparent conductive oxides may be $SnO_2$ doped with In or F. The transparent metal-oxide film may have high transmissivity (such as >80%), while retaining high carrier mobility. These films may be deposited via magnetron sputtering, chemical vapor deposition, epitaxial growth, solution deposition, spraying, or pulsed laser deposition, for example. Other doped oxides which may be used as films to induce the electric field and provide the on/off function may be doped binary compounds such as ZnO, with Al dopants or other transition-metal dopants such as Mo or Ta, which give access to higher electron-mobility and electron-conductivity regimes compared to $SnO_2$. Other wide-bandgap, correlated perovskite crystal structures such as $BaSnO_3$, $SrVO_3$, or $CaVO_3$ may be utilized for an electric field-generating bed as well. Outside of metallic or oxide-based materials, transparent conducting polymers such as poly(3,4-ethylenedioxythiophene), poly(styrene sulfonate), poly(4,4-dioctyl cyclopentadithiophene), or combinations thereof, have tunable, conjugated double bonds that promote conduction and selective light absorption.

In some embodiments, the deposited film is patterned. Patterning may be accomplished via photolithographic and etching steps which enable highly specific, nanometer-scale, transparent wire geometries. Specified geometries of wires allow for field enhancement which funnels the electrical or electrochemical field more efficiently into the rapid saturation of the photochromic effect. The photochromic heterostructure may be deposited onto the wire grids and supported by additional electron-transporting and hole-transporting layers which contribute to charge motion in the overall circuit that acts as an on/off switch for the photochromic darkening.

Some methods are characterized in that when the photochromic heterostructure is in the off state, the photochromic composition allows greater than 90% transmission of incident visible or infrared light with energy below a bandgap of the semiconductor nanoparticles. In various methods, in the off state, the percent transmission of incident visible or infrared light with energy below a bandgap of the semiconductor nanoparticles is about, or at least about, 80%, 85%, 90%, 91%, 92%, 93%, 94%, 95%, 96%, 97%, 98%, 99%, or 100%, including any intervening ranges.

Some methods are characterized in that when the photochromic heterostructure is in the on state, the photochromic composition allows less than 20% transmission of incident visible or infrared light with energy below a bandgap of the semiconductor nanoparticles. In various methods, in the on state, the percent transmission of incident visible or infrared light with energy below a bandgap of the semiconductor nanoparticles is about, or at most about, 20%, 15%, 10%, 9%, 8%, 7%, 6%, 5%, 4%, 3%, 2%, 1%, or 0%, including any intervening ranges.

Some alternative embodiments are predicated on the recognition that the first semiconductor nanoparticles may be doped, either intentionally or unintentionally. In these alternative embodiments, a photochromic heterostructure may comprise:
  (a) first semiconductor nanoparticles that have an average first-nanoparticle effective diameter from about 1 nanometer to about 20 nanometers, wherein the first semiconductor nanoparticles are doped with a first dopant, and wherein the first semiconductor nanoparticles have a first bandgap energy; and
  (b) second semiconductor nanoparticles that have an average second-nanoparticle effective diameter from about 1 nanometer to about 60 nanometers, wherein the second semiconductor nanoparticles are doped with a second dopant, and wherein the second semiconductor nanoparticles have a second bandgap energy,
  wherein the first bandgap energy is lower than the second bandgap energy,
  and wherein the first semiconductor nanoparticles and the second semiconductor nanoparticles are in physical contact with each other.

Other alternative embodiments provide a darkening article comprising:
  (A) a photochromic heterostructure comprising:
    first semiconductor nanoparticles that have an average first-nanoparticle effective diameter from about 1 nanometer to about 20 nanometers, wherein the first semiconductor nanoparticles are doped with a first dopant, and wherein the first semiconductor nanoparticles have a first bandgap energy; and
    second semiconductor nanoparticles that have an average second-nanoparticle effective diameter from about 1 nanometer to about 60 nanometers, wherein the second semiconductor nanoparticles are doped with a second dopant, and wherein the second semiconductor nanoparticles have a second bandgap energy,
    wherein the first bandgap energy is lower than the second bandgap energy,
    and wherein the first semiconductor nanoparticles and the second semiconductor nanoparticles are in physical contact with each other;
  (B) ligands bonded to the first semiconductor nanoparticles and/or to the second semiconductor nanoparticles; and
  (C) a matrix surrounding the first semiconductor nanoparticles and the second semiconductor nanoparticles,
  wherein the first semiconductor nanoparticles are capable of being photoexcited with light below the bandgap energy of the second semiconductor nanoparticles, to create a photoexcited hole,
  wherein the second semiconductor nanoparticles are capable of receiving the photoexcited hole in a dopant energy orbital, to create a new absorption, and wherein the photoexcited hole is trappable in the ligands and/or in the matrix, to reverse photochromism of the photochromic heterostructure.

The first dopant, when used, may be selected from transition metals, such as B, P, As, Ga, Al, In, Bi, Sb, Li, C, N, O, S, H, Cu, Fe, Ag, Eu, Ni, Mn, Co, V, Zn, Cr, V, Ti, Sc, Cd, Pd, Rh, Ru, Tc, Mo, Nb, Zr, Y, Hg, Au, Pt, Ir, Os, Re, W, Ta, Hf, La, Lu, Yb, Tm, Er, Ho, Dy, Tb, Gd, Sm, Pm, Nd, Pr, Ce, or combinations thereof.

The second dopant may be selected from transition metals, such as Cu, Fe, Ag, Eu, Ni, Mn, Co, V, Zn, Cr, V, Ti, Sc, Cd, Pd, Rh, Ru, Tc, Mo, Nb, Zr, Y, Hg, Au, Pt, Ir, Os, Re, W, Ta, Hf, La, Lu, Yb, Tm, Er, Ho, Dy, Tb, Gd, Sm, Pm, Nd, Pr, Ce, or combinations thereof. The second dopant may be the same as the first dopant, but more typically, the dopants are different.

There are many uses for the disclosed photochromic heterostructures and photochromic systems. The compositions or systems may be incorporated into lenses, windows, and sensors, for example.

Examples of window applications include windshields for vehicles, as well as windows for buildings. Windshield glare protection may be provided by self-darkening windows at a fraction of the cost of electrochromics. An example of a window application is observation windows for chemical reactors in which an operator needs to view inside a reactor that is carrying out a reaction releasing dangerous radiation, such as UV light.

Examples of sensor applications include IR sensors, visible-light sensors, UV sensors, and sensors that are configured to sense a property other than light but which may be impacted in performance by light—e.g., temperature sensors, pressure sensors, pH sensors, humidity sensors, CO sensors, $CO_2$ sensors, $CH_4$ sensors, ionizing-radiation sensors, magnetic sensors, and so on.

Other applications include, but are by no means limited to, switching polarizers, satellites, autonomous-vehicle cameras, solar-cell protection, and laser protection.

EXAMPLES

Comparative Example: Synthesis of Copper-Doped Zinc Sulfide Nanoparticles with 3-Mercaptopropionic Acid Ligands Chemical synthesis of Cu-doped ZnS nanocrystals is carried out as follows. In this comparative example, ZnS is a semiconductor nanoparticle, copper is a transition-metal dopant particle, and 3-mercaptopropionic acid is an organic ligand.

$Zn(CH_3COO)_2 \cdot 2H_2O$ (0.549 g, 2.5011 mmol) and $Cu(C_5H_7O_2)_2$ (0.007 g, 0.0253 mmol) are dissolved in deionized water (50 mL, 2774.7 mmol). Then, 3-mercaptopropionic acid (1.0 mL, 11.494 mmol) is added to the solution. The solution pH is adjusted to 10.3 using 2 M aqueous solution of NaOH. After sparging with Ar for 30 min, a 0.46 M aqueous solution of $Na_2S$ (2.5 mL, 1.1499 mmol) is injected into the solution under vigorous stirring at room temperature. The mixed solution is kept for 15 min under magnetic stirring while sparging, then heated to 100° C. for 24 hr to form nanocrystals. The obtained Cu-doped ZnS nanocrystals are precipitated by ethanol (solution:ethanol=4:1 vol:vol), and centrifuged at 4,000 revolutions per minute (rpm) for 5 min to form a precipitate. The precipitate is then dried in vacuum at 50° C.

The Cu-doped ZnS nanocrystals are cast into a film using drop-casting. XRD analysis indicates an average crystallite size of 3.1 nm. The bandgap of the Cu-doped ZnS nanocrystals is about 350 nm (about 3.5 eV bandgap energy).

Figure 5:
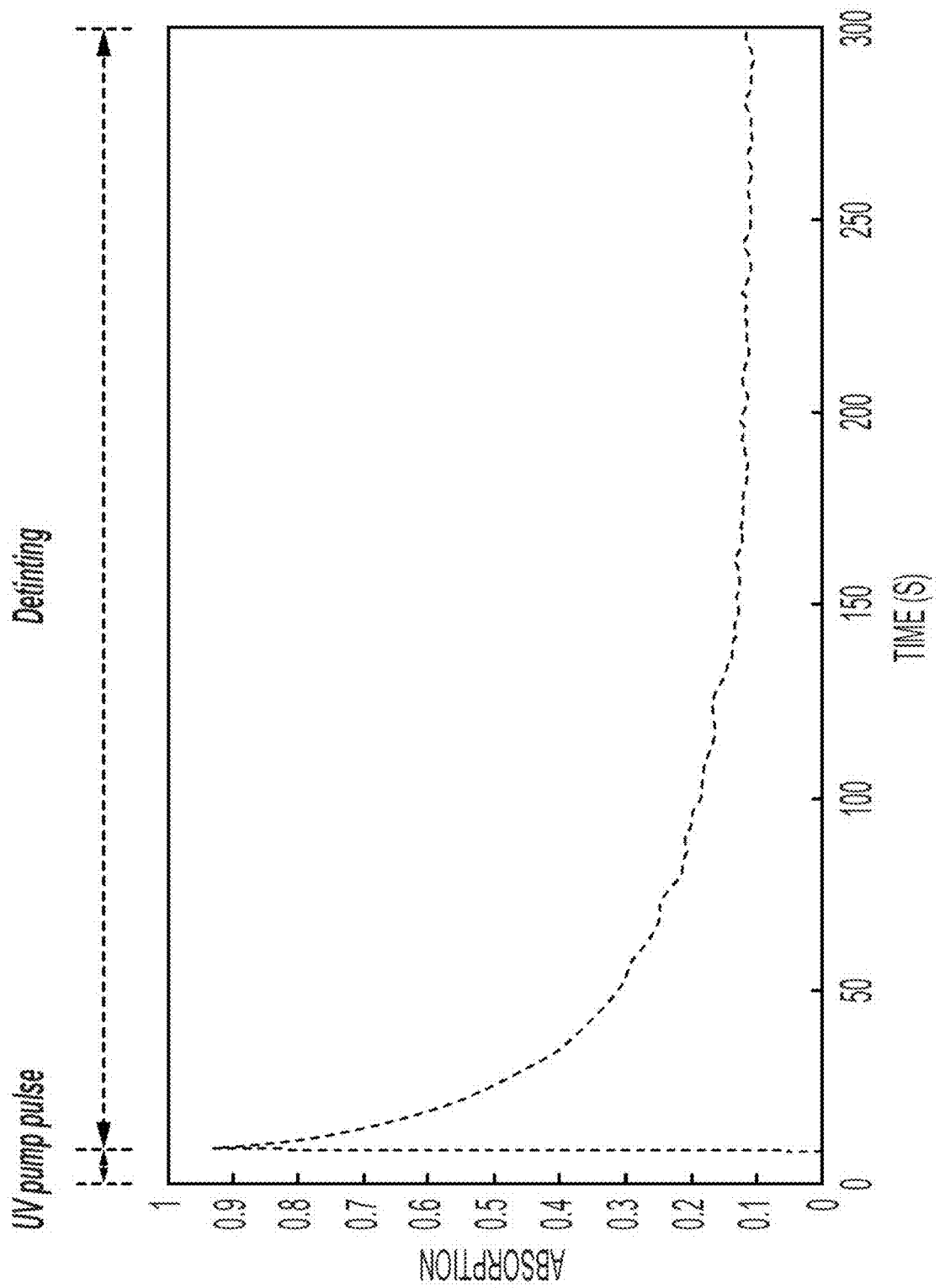
FIG. 5 shows darkening and detinting of drop-cast Cu-doped ZnS nanoparticles, in the Comparative Example.

The photodarkening of the Cu-doped ZnS nanocrystals is tested using exposure to a 365 nm light source and subsequent detinting. FIG. 5 shows darkening and detinting of drop-cast Cu-doped ZnS nanoparticles. Photochromism is initiated with a 365 nm pulse and probed by visible absorption at 600 nm.

The nanoparticles are exposed to a 532 nm optical source and no darkening occurs, because 530 nm is much lower energy (~2.3 eV) than the 350 nm ZnS bandgap energy of ~3.5 eV. These results can be compared to Example 1 below.

Example 1: Synthesis of a Core-Shell Heterostructure with a Core of CdSe Nanoparticles and a Shell of Cu-Doped ZnS Nanoparticles In this example of the invention, CdSe is a first semiconductor nanoparticle, ZnS is a second semiconductor nanoparticle, copper is a transition-metal dopant that dopes the ZnS second semiconductor nanoparticle, and oleic acid is an organic carboxylate ligand. The core-shell heterostructure is referred to in this example as "CdSe—Cu:ZnS" where Cu:ZnS refers to copper-doped zinc sulfide in the shell around a cadmium selenide core, while "CdSe—ZnS" refers to undoped zinc sulfide in the shell around a cadmium selenide core.

3-nm-diameter CdSe—ZnS quantum dots are covered with oleic acid (carboxylate) ligands and diluted to 10 mg/mL in toluene. 10 mL (100 mg) CdSe—ZnS quantum dots are combined with 1.6 mL of 0.31 mM copper acetylacetonate in toluene and stirred for 24 hours. The obtained CdSe—Cu:ZnS (doped) quantum dots are precipitated by ethanol, centrifuged (4,000 rpm for 5 min), and then the precipitate is suspended in toluene at 50 mg/mL.

Figure 6:
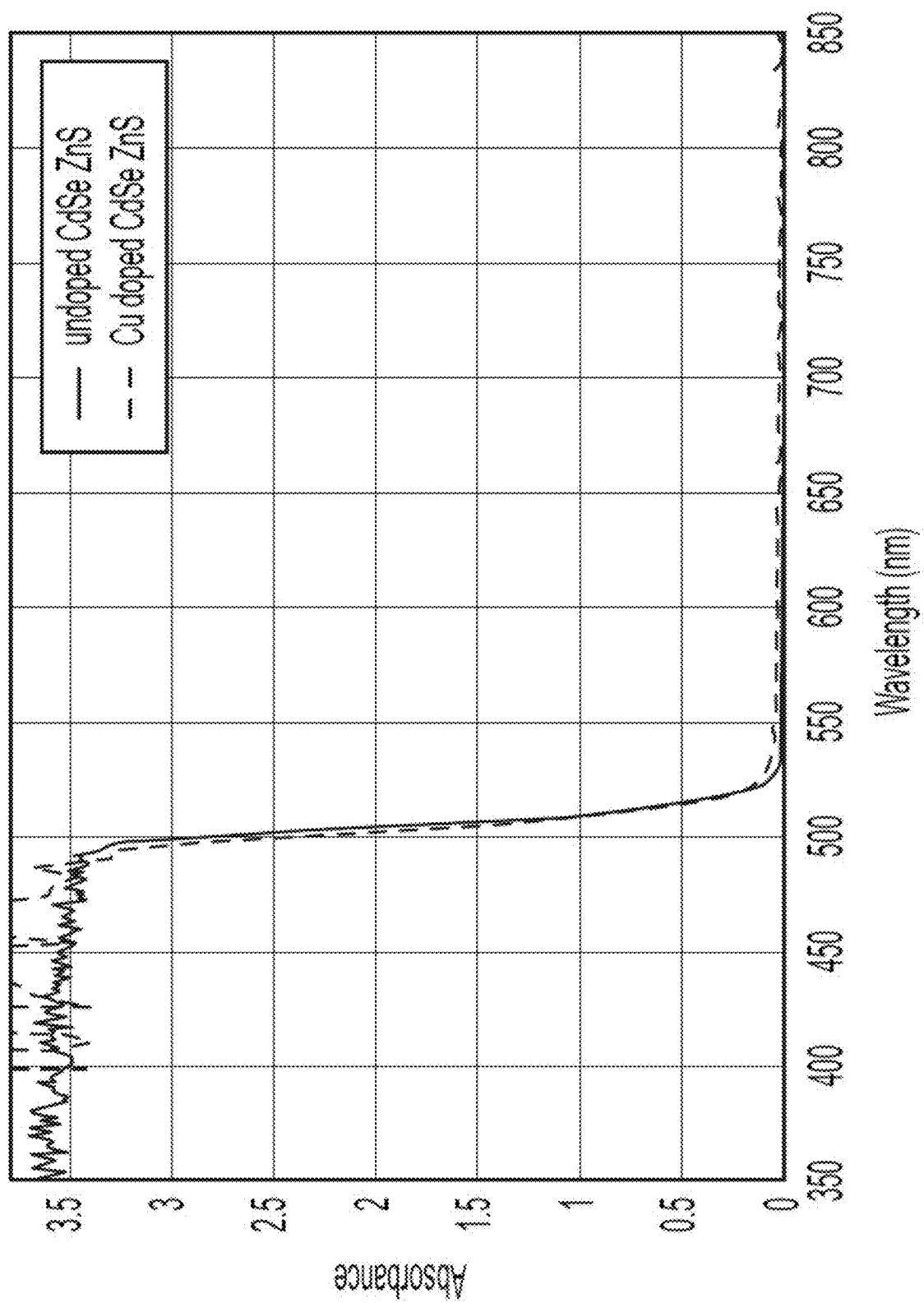
FIG. 6 shows that copper doping does not change the optical absorption spectrum of CdSe—ZnS core-shell assemblies, in Example 1.

As shown in FIG. 6, the copper doping does not change the optical absorption spectrum. In particular, the absorbance-versus-wavelength response is almost identical between undoped CdSe—ZnS and copper-doped CdSe—Cu:ZnS. According to the optical absorption spectra of CdSe—ZnS core-shell quantum dots before and after copper doping, no change in the optical absorption spectrum occurs. The bandgap is ~2.54 eV (about 488 nm) and is due to the CdSe core.

Figure 7:
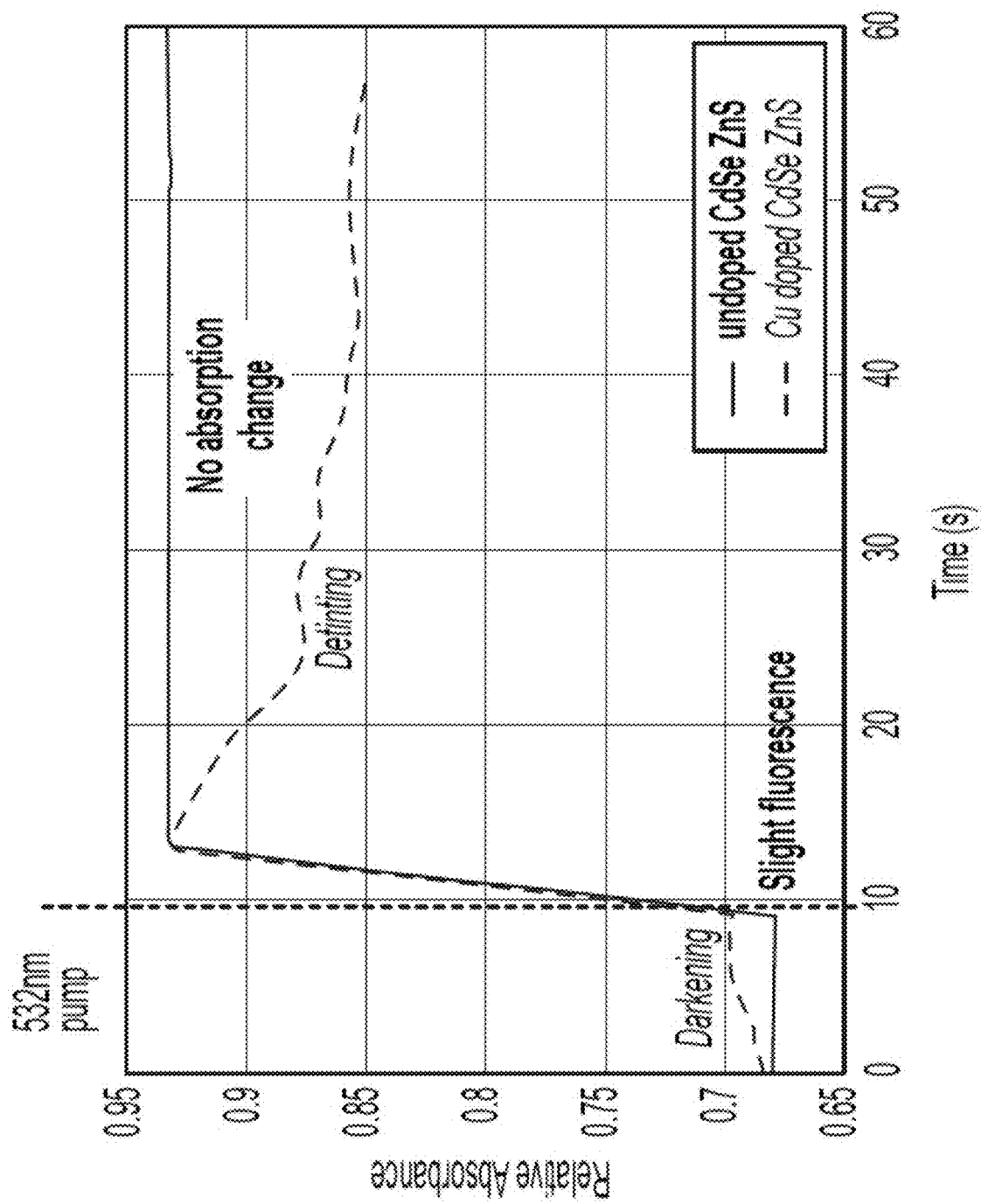
FIG. 7 shows darkening and detinting of CdSe—Cu:ZnS core-shell quantum dots compared to undoped CdSe—ZnS core-shell quantum dots, in Example 1.

The CdSe—Cu:ZnS quantum dots are then photoexcited at 532 nm; the photodarkening is revealed in FIG. 7. FIG. 7 shows darkening and detinting of CdSe—Cu:ZnS core-shell quantum dots compared to undoped CdSe—ZnS core-shell quantum dots. Only the doped quantum dots darken. There is a slight fluorescence in the undoped CdSe—ZnS while the pump is on. which results in lower relative absorbance compared to when the pump is off. The optical pump is turned off after 10 seconds (dashed line) and the initial jump in absorbance for both samples is an artifact from removing the pump intensity. Over the following 40 seconds, the CdSe—Cu:ZnS core-shell quantum dots decrease in absorbance as they detint, whereas the undoped sample shows essentially no change in absorbance.

The observed photodarkening requires CdSe, because the Cu-doped ZnS did not photodarken with 532 nm excitation according to the Comparative Example. Furthermore, the CdSe cannot photodarken alone in response to the 532 nm light because the dopants are only in contact with the ZnS. Because the ZnS alone cannot photodarken in response to below-bandgap light, and because no dopants are in contact with CdSe, the CdSe is absorbing light and creating photo-excited carriers that cause the Cu-doped ZnS shell to undergo photoredox of the Cu. This creates a new midgap state and thus new optical absorption, which results in photodarkening. The Cu-doped heterostructures can still darken in response to higher-energy excitations above the ZnS bandgap with the same photochromic behavior as the pure Cu-doped ZnS nanoparticles.

In this detailed description, reference has been made to multiple embodiments and to the accompanying drawings in which are shown by way of illustration specific exemplary embodiments of the invention. These embodiments are described in sufficient detail to enable those skilled in the art to practice the invention, and it is to be understood that modifications to the various disclosed embodiments may be made by a skilled artisan.

Where methods and steps described above indicate certain events occurring in certain order, those of ordinary skill in the art will recognize that the ordering of certain steps may be modified and that such modifications are in accordance with the variations of the invention. Additionally, certain steps may be performed concurrently in a parallel process when possible, as well as performed sequentially.

All publications, patents, and patent applications cited in this specification are herein incorporated by reference in their entirety as if each publication, patent, or patent application were specifically and individually put forth herein.

The embodiments, variations, and figures described above should provide an indication of the utility and versatility of the present invention. Other embodiments that do not provide all of the features and advantages set forth herein may also be utilized, without departing from the spirit and scope of the present invention. Such modifications and variations are considered to be within the scope of the invention defined by the claims.

What is claimed is:

1. A photochromic heterostructure comprising:
   (a) first semiconductor nanoparticles that have an average first-nanoparticle effective diameter from about 1 nanometer to about 20 nanometers, wherein said first semiconductor nanoparticles are not doped, and wherein said first semiconductor nanoparticles have a first bandgap energy; and
   (b) second semiconductor nanoparticles that have an average second-nanoparticle effective diameter from about 1 nanometer to about 60 nanometers, wherein said second semiconductor nanoparticles are doped with one or more transition metals, and wherein said second semiconductor nanoparticles have a second bandgap energy,
   wherein said first bandgap energy is lower than said second bandgap energy,
   and wherein said first semiconductor nanoparticles and said second semiconductor nanoparticles are in physical contact with each other, forming a photochromic nanoparticle pair that is (i) not a core-shell structure, or (ii) a core-shell structure containing a core of said first semiconductor nanoparticles and a shell of said second semiconductor nanoparticles, or (iii) a core-shell structure containing a core of said second semiconductor nanoparticles and a shell of said first semiconductor nanoparticles.

2. A photochromic heterostructure comprising:
   (a) first semiconductor nanoparticles that have an average first-nanoparticle effective diameter from about 1 nanometer to about 20 nanometers, wherein said first semiconductor nanoparticles are not doped, and wherein said first semiconductor nanoparticles have a first bandgap energy; and (b) second semiconductor nanoparticles that have an average second-nanoparticle effective diameter from about 1 nanometer to about 60 nanometers, wherein said second semiconductor nanoparticles are doped with one or more transition metals, and wherein said second semiconductor nanoparticles have a second bandgap energy, wherein said first bandgap energy is lower than said second bandgap energy, wherein said first semiconductor nanoparticles and said second semiconductor nanoparticles are in physical contact with each other, and wherein said photochromic heterostructure comprises a plurality of core-shell structures, wherein each of said core-shell structures contains a core of said first semiconductor nanoparticles, and a shell of said second semiconductor nanoparticles.

3. A photochromic heterostructure comprising:
(a) first semiconductor nanoparticles that have an average first-nanoparticle effective diameter from about 1 nanometer to about 20 nanometers, wherein said first semiconductor nanoparticles are not doped, and wherein said first semiconductor nanoparticles have a first bandgap energy; and
(b) second semiconductor nanoparticles that have an average second-nanoparticle effective diameter from about 1 nanometer to about 60 nanometers, wherein said second semiconductor nanoparticles are doped with one or more transition metals, and wherein said second semiconductor nanoparticles have a second bandgap energy, wherein said first bandgap energy is lower than said second bandgap energy, wherein said first semiconductor nanoparticles and said second semiconductor nanoparticles are in physical contact with each other, and wherein said photochromic heterostructure comprises a plurality of core-shell structures, wherein each of said core-shell structures contains a core of said second semiconductor nanoparticles, and a shell of said first semiconductor nanoparticles.

4. The photochromic heterostructure of claim 1, wherein each of said first semiconductor nanoparticles and said second semiconductor nanoparticles, not counting dopant elements contained therein, are independently selected from the group consisting of single-element nanoparticles, two-element nanoparticles, three-element nanoparticles, four-element nanoparticles, and combinations thereof.

5. The photochromic heterostructure of claim 4, wherein said single-element nanoparticles are selected from the group consisting of Si, Ge, and combinations thereof.

6. The photochromic heterostructure of claim 4, wherein said two-element nanoparticles are selected from the group consisting of ZnS, ZnSe, ZnTe, CdS, CdSe, CdTe, PbS, PbSe, PbTe, InP, InAs, InSb, GaP, GaAs, $Ag_2S$, $Ag_2Se$, $Ag_2Te$, and combinations thereof.

7. The photochromic heterostructure of claim 4, wherein said three-element nanoparticles are selected from the group consisting of $Zn_xCd_{1-x}S$, $Zn_xCd_{1-x}Se$, $Zn_xCd_{1-x}Te$, $Zn_xPb_{1-x}S$, $Zn_xPb_{1-x}Se$, $Zn_xPb_{1-x}Te$, $Zn_xSn_{1-x}S$, $Zn_xSn_{1-x}Se$, $Zn_xSn_{1-x}Te$, $Pb_xSn_{1-x}S$, $Pb_xSn_{1-x}Se$, $Pb_xSn_{1-x}Te$, $In_xGa_{1-x}P$, $In_xGa_{1-x}As$, $Ag_{2x}Cd_{1-x}S$, $Ag_{2x}Cd_{1-x}Se$, $Ag_{2x}Cd_{1-x}Te$, $Ag_{2x}Pb_{1-x}S$, $Ag_{2x}Pb_{1-x}Se$, $Ag_{2x}Pb_{1-x}Te$, $Ag_{2x}Sn_{1-x}S$, $Ag_{2x}Sn_{1-x}Se$, $Ag_{2x}Sn_{1-x}Te$, and combinations thereof, wherein $0<x<1$.

8. The photochromic heterostructure of claim 1, wherein said one or more transition metals are selected from the group consisting of Cu, Fe, Ag, Eu, and combinations thereof.

9. The photochromic heterostructure of claim 1, wherein said one or more transition metals are incorporated into a crystal lattice of said second semiconductor nanoparticles.

10. The photochromic heterostructure of claim 1, wherein said one or more transition metals are incorporated on surfaces of said second semiconductor nanoparticles.

11. The photochromic heterostructure of claim 1, wherein said one or more transition metals have an orbital that lies within a bandgap of said second semiconductor nanoparticles.

12. The photochromic heterostructure of claim 1, wherein first ligands are bonded to said first semiconductor nanoparticles, and wherein said first ligands contain a carboxylate functional group, a thiol functional group, an amine functional group, or a combination thereof.

13. The photochromic heterostructure of claim 1, wherein second ligands are bonded to said second semiconductor nanoparticles, and wherein said second ligands contain a carboxylate functional group, a thiol functional group, an amine functional group, or a combination thereof.

14. The photochromic heterostructure of claim 1, wherein said first semiconductor nanoparticles and said second semiconductor nanoparticles are surrounded by a matrix.

15. A darkening article comprising:
(A) a photochromic heterostructure comprising:
first semiconductor nanoparticles that have an average first-nanoparticle effective diameter from about 1 nanometer to about 20 nanometers, wherein said first semiconductor nanoparticles are not doped, and wherein said first semiconductor nanoparticles have a first bandgap energy; and
second semiconductor nanoparticles that have an average second-nanoparticle effective diameter from about 1 nanometer to about 60 nanometers, wherein said second semiconductor nanoparticles are doped with one or more transition metals, and wherein said second semiconductor nanoparticles have a second bandgap energy, wherein said first bandgap energy is lower than said second bandgap energy, and wherein said first semiconductor nanoparticles and said second semiconductor nanoparticles are in physical contact with each other, forming a photochromic nanoparticle pair that is (i) not a core-shell structure, or (ii) a core-shell structure containing a core of said first semiconductor nanoparticles and a shell of said second semiconductor nanoparticles, or (iii) a core-shell structure containing a core of said second semiconductor nanoparticles and a shell of said first semiconductor nanoparticles;

(B) ligands bonded to said first semiconductor nanoparticles and/or to said second semiconductor nanoparticles; and (C) a matrix surrounding said first semiconductor nanoparticles and said second semiconductor nanoparticles, wherein said first semiconductor nanoparticles are capable of being photoexcited with light below the bandgap energy of said second semiconductor nanoparticles, to create a photoexcited hole, wherein said second semiconductor nanoparticles are capable of receiving said photoexcited hole in a dopant energy orbital, to create a new absorption, and wherein said photoexcited hole is trappable in said ligands and/or in said matrix, to reverse photochromism of said photochromic heterostructure.

16. The darkening article of claim 15, wherein said photochromic heterostructure comprises a plurality of core-shell structures, wherein each of said core-shell structures contains a core of said first semiconductor nanoparticles, and a shell of said second semiconductor nanoparticles.

17. The darkening article of claim 15, wherein each of said first semiconductor nanoparticles and said second semiconductor nanoparticles, not counting dopant elements contained therein, are independently selected from the group consisting of single-element nanoparticles, two-element nanoparticles, three-element nanoparticles, four-element nanoparticles, and combinations thereof.

18. The darkening article of claim 17, wherein said single-element nanoparticles are selected from the group consisting of Si, Ge, and combinations thereof.

19. The darkening article of claim 17, wherein said two-element nanoparticles are selected from the group consisting of ZnS, ZnSe, ZnTe, CdS, CdSe, CdTe, PbS, PbSe, PbTe, InP, InAs, InSb, GaP, GaAs, $Ag_2S$, $Ag_2Se$, $Ag_2Te$, and combinations thereof.

20. The darkening article of claim 17, wherein said three-element nanoparticles are selected from the group consisting of $Zn_xCd_{1-x}S$, $Zn_xCd_{1-x}Se$, $Zn_xCd_{1-x}Te$, $Zn_xPb_{1-x}S$, $Zn_xPb_{1-x}Se$, $Zn_xPb_{1-x}Te$, $Zn_xSn_{1-x}S$, $Zn_xSn_{1-x}Se$, $Zn_xSn_{1-x}Te$, $Pb_xSn_{1-x}S$, $Pb_xSn_{1-x}Se$, $Pb_xSn_{1-x}Te$, $In_xGa_{1-x}P$, $In_xGa_{1-x}As$, $Ag_{2x}Cd_{1-x}S$, $Ag_{2x}Cd_{1-x}Se$, $Ag_{2x}Cd_{1-x}Te$, $Ag_{2x}Pb_{1-x}S$, $Ag_{2x}Pb_{1-x}Se$, $Ag_{2x}Pb_{1-x}Te$, $Ag_{2x}Sn_{1-x}S$, $Ag_{2x}Sn_{1-x}Se$, $Ag_{2x}Sn_{1-x}Te$, and combinations thereof, wherein $0<x<1$.

21. The darkening article of claim 15, wherein said one or more transition metals are selected from the group consisting of Cu, Fe, Ag, Eu, and combinations thereof.

22. The darkening article of claim 15, wherein said one or more transition metals are incorporated into a crystal lattice of said second semiconductor nanoparticles.

23. The darkening article of claim 15, wherein said one or more transition metals are incorporated on surfaces of said second semiconductor nanoparticles.

24. The darkening article of claim 15, wherein said one or more transition metals have an orbital that lies within a bandgap of said second semiconductor nanoparticles.

25. The darkening article of claim 15, wherein said ligands contain a carboxylate functional group, a thiol functional group, an amine functional group, or a combination thereof.

* * * * *